(12) United States Patent
Jayaraman et al.

(10) Patent No.: US 12,101,282 B1
(45) Date of Patent: Sep. 24, 2024

(54) DIGITAL FINANCIAL MANAGEMENT HAVING CHAT SUPPORT PLATFORM TO FACILITATE CHAT WINDOW CUSTOMIZATION BY USER COMMAND

(71) Applicant: Truist Bank, Charlotte, NC (US)

(72) Inventors: Barath Jayaraman, Charlotte, NC (US); John Briggs, Charlotte, NC (US)

(73) Assignee: Truist Bank, Charlotte, NC (US)

( * ) Notice: Subject to any disclaimer, the term of this patent is extended or adjusted under 35 U.S.C. 154(b) by 0 days.

(21) Appl. No.: 18/180,776

(22) Filed: Mar. 8, 2023

(51) Int. Cl.
*H04L 51/04* (2022.01)
*G06Q 30/015* (2023.01)
*H04L 51/02* (2022.01)

(52) U.S. Cl.
CPC .......... *H04L 51/04* (2013.01); *G06Q 30/015* (2023.01); *H04L 51/02* (2013.01)

(58) Field of Classification Search
CPC ........ H04L 51/04; H04L 51/02; G06Q 30/015
See application file for complete search history.

(56) References Cited

U.S. PATENT DOCUMENTS

| | | | | |
|---|---|---|---|---|
| 5,416,890 A | * | 5/1995 | Beretta | H04N 1/6058 345/590 |
| 2003/0112278 A1 | * | 6/2003 | Driskell | G06F 9/451 715/788 |
| 2004/0056894 A1 | * | 3/2004 | Zaika | G06F 9/454 715/762 |
| 2004/0191744 A1 | * | 9/2004 | Guirguis | G09B 7/02 434/322 |
| 2006/0161859 A1 | * | 7/2006 | Holecek | G06F 3/048 715/781 |
| 2009/0215476 A1 | * | 8/2009 | Tysowski | H04L 51/04 455/466 |
| 2010/0205529 A1 | * | 8/2010 | Butin | G06F 8/38 715/704 |
| 2012/0117497 A1 | * | 5/2012 | Uola | G06F 9/451 715/762 |
| 2012/0189272 A1 | * | 7/2012 | Kunigita | H04N 21/4788 386/E9.011 |
| 2012/0290940 A1 | * | 11/2012 | Quine | G06F 8/34 715/744 |
| 2013/0212466 A1 | * | 8/2013 | Khalatian | G06Q 50/01 715/753 |
| 2014/0039784 A1 | * | 2/2014 | Millspaugh | G08G 1/205 701/300 |
| 2015/0277682 A1 | * | 10/2015 | Kaufthal | G06F 9/451 715/763 |

(Continued)

*Primary Examiner* — Michael Won
(74) *Attorney, Agent, or Firm* — Jordan IP Law, LLC; Todd A. Vaughn

(57) ABSTRACT

A computing device, a computer program product, and a computer-implemented method for delivering enhanced financial services and, more particularly, for facilitating enhanced network communication between a user and a financial institution via a client device. A digital financial management platform for the client device includes a chat support platform that facilitates an enhanced user chat experience by enabling the dynamic modification of the general aesthetic appearance or configuration of the chat window by user command or request contemporaneously with a virtual chat communication session between a virtual support agent of a financial institution and a user on a client device.

20 Claims, 11 Drawing Sheets

(56) References Cited

U.S. PATENT DOCUMENTS

| | | | |
|---|---|---|---|
| 2015/0302103 A1* | 10/2015 | Jeremias | G06Q 10/107 |
| | | | 715/758 |
| 2015/0319203 A1* | 11/2015 | Jeremias | G06F 3/0484 |
| | | | 715/753 |
| 2015/0341401 A1* | 11/2015 | Lee | G06Q 10/101 |
| | | | 715/753 |
| 2016/0313906 A1* | 10/2016 | Kilchenko | G06Q 30/0269 |
| 2018/0063328 A1* | 3/2018 | Eisner | H04M 3/5133 |
| 2018/0181286 A1* | 6/2018 | McKay | G06F 3/04886 |
| 2018/0188905 A1* | 7/2018 | Tran | G06F 3/04845 |
| 2019/0087707 A1* | 3/2019 | Cummins | G06F 16/3329 |
| 2019/0377588 A1* | 12/2019 | Gupta | G06F 3/0484 |
| 2021/0201035 A1* | 7/2021 | Faulkner | G06F 3/04815 |
| 2023/0030662 A1* | 2/2023 | Beaver, III | G06Q 10/06313 |
| 2023/0231972 A1* | 7/2023 | Nguyen | H04L 12/1827 |
| | | | 348/14.08 |

\* cited by examiner

VIRTUAL CHAT COMMUNICATION SESSION

Virtual Support Agent: Good afternoon. How may I assist you?
502

User: Please change the general shape of the chat window.
503

Virtual Support Agent: I understand you wish to change the shape of the chat window. Is this correct?
504

User: Yes, this is correct.
505

Virtual Support Agent: Great. To which specific shape would you like to change?
506

User: A star.
507

Virtual Support Agent: I understand you wish to change the shape to a star. Is this correct?
508

User: Yes, this is correct.
509

Virtual Support Agent: Great. We will now change the shape of the chat window to a star.
510

*Type your message and press [enter]...*

DIGITAL FINANCIAL MANAGEMENT HAVING CHAT SUPPORT PLATFORM TO FACILITATE CHAT WINDOW CUSTOMIZATION BY USER COMMAND

TECHNICAL FIELD

The present disclosure relates to a computing device, computer program product, and computer-implemented method for delivering digital financial services and, more particularly, for a chat support platform that facilitates an enhanced user chat experience by enabling the general aesthetic appearance or configuration of the chat window to be dynamically modified by user command or request contemporaneously with a virtual chat communication session between a virtual support agent of a financial institution and a user on a client device.

BACKGROUND

Financial institutions that provide financial services are increasingly providing a greater number of client services. In order to alleviate call and chat density from customers over a network environment, such client services include automated support agents (e.g., a chatbot) who supplement human support agents by directly interacting with customers via text chat, phone, instant messaging, etc. The data and information shared by the user and the virtual support agent in a virtual chat communication session is stored in a storage location by the financial institution. In some instances, a chat session may involve a virtual support agent providing a user with data and information that may be of some use to the user at a later point in future, i.e., after the conclusion of the chat session.

SUMMARY

The present disclosure relates to a computing device, a computer program product, and a computer-implemented method for delivering enhanced digital financial services over a communication network by providing a digital financial management platform for a client device that includes a chat support platform that facilitates an enhanced user chat experience. The chat support platform facilitates a more enhanced chat experience by enabling the dynamic modification of the general aesthetic appearance or configuration of the chat window by user command or request contemporaneously with a virtual chat communication session between a virtual support agent of a financial institution and a user on a client device.

For instance, during the virtual chat communication session, the user may request/command, via a client device, to change one or more aspects of the general aesthetic appearance or configuration of the chat window. This may be done or several reasons. For instance, the user may be visually impaired, and thus, desires to change the general aesthetic appearance or configuration of the chat window in a manner that makes it easier to see the textual content of the chat messages. The user may have a general desire to change the general aesthetic appearance or configuration of the chat window to convey some artistic meaning the user has. The user may have a general desire to change the general aesthetic appearance or configuration of the chat window to influence the mood of the user. The user may have a general desire to change the general aesthetic appearance or configuration of the chat window in order to have the ability to see content that is visually displayed on a background graphical user interface (e.g., the digital dashboard of the financial institution.

In accordance with one or more embodiments set forth, illustrated, and described herein, an apparatus may comprise one or more of the following: one or more processors; and a non-transitory memory coupled to the one or more processors, the non-transitory memory including a set of instructions of computer-executable program code, which when executed by the one or more processors, cause the apparatus to, during a virtual chat communication session between a virtual support agent of a financial institution and a user on a client device executing a mobile application or desktop application associated with the financial institution over a communication network: receive, from the client device contemporaneously with the virtual chat communication session, a command to modify an aesthetic appearance of the chat window; and dynamically modify the aesthetic appearance of the chat window in response to the command and contemporaneously with the virtual chat communication session.

In accordance with one or more embodiments set forth, illustrated, and described herein, an apparatus may comprise one or more of the following: one or more processors; and a non-transitory memory coupled to the one or more processors, the non-transitory memory including a set of instructions of computer-executable program code, which when executed by the one or more processors, cause the apparatus to: cause a visual display of a first graphical user interface (GUI) on a user interface of a client device of a user in response to execution of a mobile application or desktop application associated with a financial institution over a communication network, the first GUI including a dashboarding having content related to one or more financial accounts of the user maintained by the financial institution; cause a visual display of a second GUI superimposed on the first GUI, the second GUI including a chat window to facilitate a virtual chat communication session between the user and a virtual support agent of the financial institution; receive, from the client device contemporaneously with the virtual chat communication session, a command to modify an aesthetic appearance of the chat window; and dynamically modify the aesthetic appearance of the chat window in response to the command and contemporaneously with the virtual chat communication session.

In accordance with each respective apparatus, each command comprises a verbal command.

In accordance with each respective apparatus, the set of instructions, which when executed by the one or more processors, cause the apparatus to execute natural language processing (NLP) of each verbal command.

In accordance with each respective apparatus, each command comprises a textual command.

In accordance with each respective apparatus, the set of instructions, which when executed by the one or more processors, cause the apparatus to execute natural language processing (NLP) of each textual command.

In accordance with each respective apparatus, the set of instructions, which when executed by the one or more processors, cause the apparatus to generate, in response to the NLP and contemporaneously with the virtual chat communication session, a response to the command.

In accordance with each respective apparatus, the set of instructions, which when executed by the one or more processors, cause the apparatus to transmit a chat message presented by the virtual support agent, the chat message containing the generated response.

In accordance with each respective apparatus, the generated response comprises an acknowledgement of the command.

In accordance with each respective apparatus, the generated response comprises a query requesting that the user confirm the command.

In accordance with each respective apparatus, the generated response comprises one or more probing questions.

In accordance with each respective apparatus, the command comprises a command to modify a size (i.e., minimize or maximize) of the chat window, and the set of instructions, which when executed by the one or more processors, cause the apparatus to dynamically modify, in response to the command and contemporaneously with the virtual chat communication session, the size of the chat window to a desired size.

In accordance with each respective apparatus, the command comprises a command to modify a size (i.e., minimize or maximize) of the chat window, and the set of instructions, which when executed by the one or more processors, cause the apparatus to enable the user, in response to the command and contemporaneously with the virtual chat communication session, to manipulate the chat window in a manner which dynamically modifies the size of the chat window to a desired size.

In accordance with each respective apparatus, the command comprises a command to modify a size (i.e., minimize or maximize) of the chat window, and the set of instructions, which when executed by the one or more processors, cause the apparatus to: generate, in response to the command and contemporaneously with the virtual chat communication session, a response comprising a query as to the desired size for the chat window; receive a user response to the query that includes the desired size; and dynamically modify, in response to the user response and contemporaneously with the virtual chat communication session, the general shape of the chat window to the desired size.

In accordance with each respective apparatus, the command comprises a command to modify a geometric configuration of the chat window, and the set of instructions, which when executed by the one or more processors, cause the apparatus to dynamically modify the geometric configuration of the chat window in response to the command and contemporaneously with the virtual chat communication session. The geometric configuration of the chat window may comprise a 2D geometric configuration. Such a 2D geometric configuration may include, but is not limited to, various types of polygon configurations, circular configurations, etc.

In accordance with each respective apparatus, the command comprises a command to modify a geometric configuration of the chat window, and the set of instructions, which when executed by the one or more processors, cause the apparatus to enable the user, in response to the command and contemporaneously with the virtual chat communication session, to manipulate the chat window in a manner which dynamically modifies the geometric configuration of the chat window to a desired geometric configuration.

In accordance with each respective apparatus, the command comprises a command to modify a geometric configuration of the chat window, and the set of instructions, which when executed by the one or more processors, cause the apparatus to: generate, in response to the command and contemporaneously with the virtual chat communication session, a response comprising a query as to the desired geometric configuration for the chat window; receive a user response to the query that includes the desired geometric configuration; and dynamically modify, in response to the user response and contemporaneously with the virtual chat communication session, the geometric configuration of the chat window to the desired geometric configuration.

In accordance with each respective apparatus, the command comprises a command to modify a general shape of the chat window, and the set of instructions, which when executed by the one or more processors, cause the apparatus to dynamically modify the general shape of the chat window in response to the command and contemporaneously with the virtual chat communication session.

In accordance with each respective apparatus, the command comprises a command to modify a general shape of the chat window, and the set of instructions, which when executed by the one or more processors, cause the apparatus to enable the user, in response to the command and contemporaneously with the virtual chat communication session, to modify the general shape of the chat window to a desired shape.

In accordance with each respective apparatus, the command comprises a command to modify a general shape of the chat window, and the set of instructions, which when executed by the one or more processors, cause the apparatus to: generate, in response to the command and contemporaneously with the virtual chat communication session, a response comprising a query as to the desired type of shape for the chat window; receive a user response to the query that includes the desired shape; and dynamically modify, in response to the user response and contemporaneously with the virtual chat communication session, the general shape of the chat window to the desired shape.

In accordance with each respective apparatus, the command comprises a command to reshape a portion of the chat window, and the set of instructions, which when executed by the one or more processors, cause the apparatus to dynamically reshape a portion of the chat window in response to the command and contemporaneously with the virtual chat communication session.

In accordance with each respective apparatus, the command comprises a command to reshape a portion of the chat window, and the set of instructions, which when executed by the one or more processors, cause the apparatus to enable the user, in response to the command and contemporaneously with the virtual chat communication session, to reshape a portion of the chat window to a desired shape.

In accordance with each respective apparatus, the command comprises a command to reshape a portion of the chat window, and the set of instructions, which when executed by the one or more processors, cause the apparatus to: generate, in response to the command and contemporaneously with the virtual chat communication session, a response comprising a query as to the desired type of shape for the portion of the chat window; receive a user response to the query that includes the desired shape; and dynamically modify, in response to the user response and contemporaneously with the virtual chat communication session, the general shape of the portion of the chat window to the desired shape.

In accordance with each respective apparatus, the portion of the chat window is reshaped in a manner that enables the user to view content visually displayed on a dashboard visually displayed on a background of the user interface, and the content is associated with one or more financial accounts of the user that are maintained by the financial institution.

In accordance with each respective apparatus, the command comprises a command to change the spatial orientation of the chat window relative to a dashboard associated with the financial institution that is visually displayed on a background of the user interface, and the set of instructions, which when executed by the one or more processors, cause the apparatus to dynamically adjust the spatial orientation of the chat window in response to the command and contemporaneously with the virtual chat communication session.

In accordance with each respective apparatus, the command comprises a command to change the spatial orientation of the chat window relative to a dashboard associated with the financial institution that is visually displayed on a background of the user interface, and the set of instructions, which when executed by the one or more processors, cause the apparatus to enable the user, in response to the command and contemporaneously with the virtual chat communication session, to change the spatial orientation of the chat window to a desired spatial orientation.

In accordance with each respective apparatus, the command comprises a command to change the spatial orientation of the chat window relative to a dashboard associated with the financial institution that is visually displayed on a background of the user interface, and the set of instructions, which when executed by the one or more processors, cause the apparatus to: generate, in response to the command and contemporaneously with the virtual chat communication session, a response comprising a query as to the desired spatial orientation of the chat window; receive a user response to the query that includes the desired spatial orientation; and dynamically change, in response to the user response and contemporaneously with the virtual chat communication session, the spatial orientation of the chat window to the desired spatial orientation.

In accordance with each respective apparatus, the spatial orientation of the chat window is changed in a manner that enables the user to view content visually displayed on the dashboard, and the content is associated with one or more financial accounts of the user that are maintained by the financial institution.

In accordance with each respective apparatus, the command comprises a command to change a background color of the chat window, and the set of instructions, which when executed by the one or more processors, cause the apparatus to dynamically change the background color of the chat window in response to the command and contemporaneously with the virtual chat communication session.

In accordance with each respective apparatus, the command comprises a command to change a background color of the chat window, and the set of instructions, which when executed by the one or more processors, cause the apparatus to enable the user, in response to the command and contemporaneously with the virtual chat communication session, to change the background color of the chat window to a desired background color.

In accordance with each respective apparatus, the command comprises a command to change a background color of the chat window, and the set of instructions, which when executed by the one or more processors, cause the apparatus to: generate, in response to the command and contemporaneously with the virtual chat communication session, a response comprising a query as to the desired background color of the chat window; receive a user response to the query that includes the desired background color; and dynamically change, in response to the user response and contemporaneously with the virtual chat communication session, the background color of the chat window to the desired background color.

In accordance with each respective apparatus, the command comprises a command to change a background shading of the chat window, and the set of instructions, which when executed by the one or more processors, cause the apparatus to dynamically change the background shading of the chat window in response to the command and contemporaneously with the virtual chat communication session.

In accordance with each respective apparatus, the command comprises a command to change a background shading of the chat window, and the set of instructions, which when executed by the one or more processors, cause the apparatus to enable the user, in response to the command and contemporaneously with the virtual chat communication session, to change the background shading of the chat window to a desired background shading.

In accordance with each respective apparatus, the command comprises a command to change a background shading of the chat window, and the set of instructions, which when executed by the one or more processors, cause the apparatus to: generate, in response to the command and contemporaneously with the virtual chat communication session, a response comprising a query as to the desired background shading of the chat window; receive a user response to the query that includes the desired background shading; and dynamically change, in response to the user response and contemporaneously with the virtual chat communication session, the background shading of the chat window to the desired background shading.

In accordance with each respective apparatus, the command comprises a command to change a text effect of the chat window, and the set of instructions, which when executed by the one or more processors, cause the apparatus to dynamically change the text effect of the chat window in response to the command and contemporaneously with the virtual chat communication session.

In accordance with each respective apparatus, the command comprises a command to change a text effect of the chat window, and the set of instructions, which when executed by the one or more processors, cause the apparatus to enable the user, in response to the command and contemporaneously with the virtual chat communication session, to change the text effect of the chat window to a desired text effect.

In accordance with each respective apparatus, the command comprises a command to change a text effect of the chat window, and the set of instructions, which when executed by the one or more processors, cause the apparatus to: generate, in response to the command and contemporaneously with the virtual chat communication session, a response comprising a query as to the desired text effect of the chat window; receive a user response to the query that includes the desired text effect; and dynamically change, in response to the user response and contemporaneously with the virtual chat communication session, the text effect of the chat window to the desired text effect.

In accordance with each respective apparatus, the set of instructions, which when executed by the one or more processors, cause the apparatus to receive, from the client device contemporaneously with the virtual chat communication session, a command to save the modified aesthetic appearance of the chat window as a default setting, and save, in response to the command, the modified aesthetic appearance of the chat window as a default setting.

In accordance with one or more embodiments set forth, illustrated, and described herein, a computer program product comprising at least one non-transitory computer readable medium having with a set of instructions of computer-executable program code, which when executed by one or more processors of a computing device, cause the computing device to: cause, during execution of a mobile application or desktop application associated with a financial institution by a client device of a user over a communication network, a visual display of a chat window on the client device to facilitate a virtual chat communication session between the user and a virtual support agent of the financial institution; receive, from the client device contemporaneously with the virtual chat communication session, a command to modify an aesthetic appearance of the chat window; and dynamically modify the aesthetic appearance of the chat window in response to the command and contemporaneously with the virtual chat communication session.

In accordance with one or more embodiments set forth, illustrated, and described herein, a computer program product comprising at least one non-transitory computer readable medium having with a set of instructions of computer-executable program code, which when executed by one or more processors of a computing device, cause the computing device to cause a visual display of a first graphical user interface (GUI) on a user interface of a client device of a user in response to execution of a mobile application or desktop application associated with a financial institution over a communication network, the first GUI including a dashboarding having content related to one or more financial accounts of the user maintained by the financial institution; cause a visual display of a second GUI superimposed on the first GUI, the second GUI including a chat window to facilitate a virtual chat communication session between the user and a virtual support agent of the financial institution; receive, from the client device contemporaneously with the virtual chat communication session, a command to modify an aesthetic appearance of the chat window; and dynamically modify the aesthetic appearance of the chat window in response to the command and contemporaneously with the virtual chat communication session.

In accordance with each respective computer program product, each command comprises a verbal command.

In accordance with each respective computer program product, the set of instructions, which when executed by the one or more processors, cause the computing device to execute natural language processing (NLP) of each verbal command.

In accordance with each respective computer program product, each command comprises a textual command.

In accordance with each respective computer program product, the set of instructions, which when executed by the one or more processors, cause the computing device to execute natural language processing (NLP) of each textual command.

In accordance with each respective computer program product, the set of instructions, which when executed by the one or more processors, cause the computing device to generate, in response to the NLP and contemporaneously with the virtual chat communication session, a response to the command.

In accordance with each respective computer program product, the set of instructions, which when executed by the one or more processors, cause the computing device to transmit a chat message presented by the virtual support agent, the chat message containing the generated response.

In accordance with each respective computer program product, the generated response comprises an acknowledgement of the command.

In accordance with each respective computer program product, the generated response comprises a query requesting that the user confirm the command.

In accordance with each respective computer program product, the generated response comprises one or more probing questions.

In accordance with each respective computer program product, the command comprises a command to modify a size (i.e., minimize or maximize) of the chat window, and the set of instructions, which when executed by the one or more processors, cause the computing device to dynamically modify the size of the chat window in response to the command and contemporaneously with the virtual chat communication session.

In accordance with each respective computer program product, the command comprises a command to modify a size (i.e., minimize or maximize) of the chat window, and the set of instructions, which when executed by the one or more processors, cause the computing device to enable the user, in response to the command and contemporaneously with the virtual chat communication session, to manipulate the chat window in a manner which dynamically modifies the size of the chat window to a desired size.

In accordance with each respective computer program product, the command comprises a command to modify a size (i.e., minimize or maximize) of the chat window, and the set of instructions, which when executed by the one or more processors, cause the computing device to: generate, in response to the command and contemporaneously with the virtual chat communication session, a response comprising a query as to the desired size for the chat window; receive a user response to the query that includes the desired size; and dynamically modify, in response to the user response and contemporaneously with the virtual chat communication session, the general shape of the chat window to the desired size.

In accordance with each respective computer program product, the command comprises a command to modify a geometric configuration of the chat window, and the set of instructions, which when executed by the one or more processors, cause the computing device to dynamically modify the geometric configuration of the chat window in response to the command and contemporaneously with the virtual chat communication session.

In accordance with each respective computer program product, the command comprises a command to modify a geometric configuration of the chat window, and the set of instructions, which when executed by the one or more processors, cause the computing device to enable the user, in response to the command and contemporaneously with the virtual chat communication session, to manipulate the chat window in a manner which dynamically modifies the geometric configuration of the chat window to a desired geometric configuration.

In accordance with each respective computer program product, the command comprises a command to modify a geometric configuration of the chat window, and the set of instructions, which when executed by the one or more processors, cause the computing device to: generate, in response to the command and contemporaneously with the virtual chat communication session, a response comprising a query as to the desired geometric configuration for the chat window; receive a user response to the query that includes the desired geometric configuration; and dynamically modify, in response to the user response and contemporaneously with the virtual chat communication session, the geometric configuration of the chat window to the desired geometric configuration.

In accordance with each respective computer program product, the command comprises a command to modify a general shape of the chat window, and the set of instructions, which when executed by the one or more processors, cause the computing device to dynamically modify the general shape of the chat window in response to the command and contemporaneously with the virtual chat communication session.

In accordance with each respective computer program product, the command comprises a command to modify a general shape of the chat window, and the set of instructions, which when executed by the one or more processors, cause the computing device to enable the user, in response to the command and contemporaneously with the virtual chat communication session, to modify the general shape of the chat window to a desired shape.

In accordance with each respective computer program product, the command comprises a command to modify a general shape of the chat window, and the set of instructions, which when executed by the one or more processors, cause the computing device to: generate, in response to the command and contemporaneously with the virtual chat communication session, a response comprising a query as to the desired type of shape for the chat window; receive a user response to the query that includes the desired shape; and dynamically modify, in response to the user response and contemporaneously with the virtual chat communication session, the general shape of the chat window to the desired shape.

In accordance with each respective computer program product, the command comprises a command to reshape a portion of the chat window, and the set of instructions, which when executed by the one or more processors, cause the computing device to dynamically reshape a portion of the chat window in response to the command and contemporaneously with the virtual chat communication session.

In accordance with each respective computer program product, the command comprises a command to reshape a portion of the chat window, and the set of instructions, which when executed by the one or more processors, cause the computing device to enable the user, in response to the command and contemporaneously with the virtual chat communication session, to reshape a portion of the chat window to a desired shape.

In accordance with each respective computer program product, the command comprises a command to reshape a portion of the chat window, and the set of instructions, which when executed by the one or more processors, cause the computing device to: generate, in response to the command and contemporaneously with the virtual chat communication session, a response comprising a query as to the desired type of shape for the portion of the chat window; receive a user response to the query that includes the desired shape; and dynamically modify, in response to the user response and contemporaneously with the virtual chat communication session, the general shape of the portion of the chat window to the desired shape.

In accordance with each respective computer program product, the portion of the chat window is reshaped in a manner that enables the user to view content visually displayed on a dashboard visually displayed on a background of the user interface, and the content is associated with one or more financial accounts of the user that are maintained by the financial institution.

In accordance with each respective computer program product, the command comprises a command to change the spatial orientation of the chat window relative to a dashboard associated with the financial institution that is visually displayed on a background of the user interface, and the set of instructions, which when executed by the one or more processors, cause the computing device to dynamically adjust the spatial orientation of the chat window in response to the command and contemporaneously with the virtual chat communication session.

In accordance with each respective computer program product, the command comprises a command to change the spatial orientation of the chat window relative to a dashboard associated with the financial institution that is visually displayed on a background of the user interface, and the set of instructions, which when executed by the one or more processors, cause the computing device to enable the user, in response to the command and contemporaneously with the virtual chat communication session, to change the spatial orientation of the chat window to a desired spatial orientation.

In accordance with each respective computer program product, the command comprises a command to change the spatial orientation of the chat window relative to a dashboard associated with the financial institution that is visually displayed on a background of the user interface, and the set of instructions, which when executed by the one or more processors, cause the computing device to: generate, in response to the command and contemporaneously with the virtual chat communication session, a response comprising a query as to the desired spatial orientation of the chat window; receive a user response to the query that includes the desired spatial orientation; and dynamically change, in response to the user response and contemporaneously with the virtual chat communication session, the spatial orientation of the chat window to the desired spatial orientation.

In accordance with each respective computer program product, the spatial orientation of the chat window is changed in a manner that enables the user to view content visually displayed on the dashboard, and the content is associated with one or more financial accounts of the user that are maintained by the financial institution.

In accordance with each respective computer program product, the command comprises a command to change a background color of the chat window, and the set of instructions, which when executed by the one or more processors, cause the computing device to dynamically change the background color of the chat window in response to the command and contemporaneously with the virtual chat communication session.

In accordance with each respective computer program product, the command comprises a command to change a background color of the chat window, and the set of instructions, which when executed by the one or more processors, cause the computing device to enable the user, in response to the command and contemporaneously with the virtual chat communication session, to change the background color of the chat window to a desired background color.

In accordance with each respective computer program product, the command comprises a command to change a background color of the chat window, and the set of instructions, which when executed by the one or more processors, cause the computing device to: generate, in response to the command and contemporaneously with the virtual chat communication session, a response comprising a query as to the desired background color of the chat window; receive a user response to the query that includes the desired background color; and dynamically change, in response to the user response and contemporaneously with the virtual chat communication session, the background color of the chat window to the desired background color.

In accordance with each respective computer program product, the command comprises a command to change a background shading of the chat window, and the set of instructions, which when executed by the one or more processors, cause the computing device to dynamically change the background shading of the chat window in response to the command and contemporaneously with the virtual chat communication session.

In accordance with each respective computer program product, the command comprises a command to change a background shading of the chat window, and the set of instructions, which when executed by the one or more processors, cause the computing device to enable the user, in response to the command and contemporaneously with the virtual chat communication session, to change the background shading of the chat window to a desired background shading.

In accordance with each respective computer program product, the command comprises a command to change a background shading of the chat window, and the set of instructions, which when executed by the one or more processors, cause the computing device to: generate, in response to the command and contemporaneously with the virtual chat communication session, a response comprising a query as to the desired background shading of the chat window; receive a user response to the query that includes the desired background shading; and dynamically change, in response to the user response and contemporaneously with the virtual chat communication session, the background shading of the chat window to the desired background shading.

In accordance with each respective computer program product, the command comprises a command to change a text effect of the chat window, and the set of instructions, which when executed by the one or more processors, cause the computing device to dynamically change the text effect of the chat window in response to the command and contemporaneously with the virtual chat communication session.

In accordance with each respective computer program product, the command comprises a command to change a text effect of the chat window, and the set of instructions, which when executed by the one or more processors, cause the computing device to enable the user, in response to the command and contemporaneously with the virtual chat communication session, to change the text effect of the chat window to a desired text effect.

In accordance with each respective computer program product, the command comprises a command to change a text effect of the chat window, and the set of instructions, which when executed by the one or more processors, cause the computing device to: generate, in response to the command and contemporaneously with the virtual chat communication session, a response comprising a query as to the desired text effect of the chat window; receive a user response to the query that includes the desired text effect; and dynamically change, in response to the user response and contemporaneously with the virtual chat communication session, the text effect of the chat window to the desired text effect.

In accordance with each respective computer program product, the set of instructions, which when executed by the one or more processors, cause the computing device to receive, from the client device contemporaneously with the virtual chat communication session, a command to save the modified aesthetic appearance of the chat window as a default setting, and save, in response to the command, the modified aesthetic appearance of the chat window as a default setting.

In accordance with one or more embodiments set forth, illustrated, and described herein, a computer-implemented method may comprise one or more of the following: causing, by one or more financial institution servers associated with a financial institution during execution of a mobile application or desktop application associated with a financial institution by a client device of a user over a communication network, a visual display of a chat interface on the client device to facilitate a virtual chat communication session between the user and a virtual support agent of the financial institution; receiving, by the one or more financial institution servers from the client device contemporaneously with the virtual chat communication session, a command to modify an aesthetic appearance of the chat window; and dynamically modifying, by the one or more financial institution servers in response to the command and contemporaneously with the virtual chat communication session, the aesthetic appearance of the chat window.

In accordance with one or more embodiments set forth, illustrated, and described herein, a computer-implemented method may comprise one or more of the following by one or more financial institution servers associated with a financial institution: causing a visual display of a first graphical user interface (GUI) on a user interface of a client device of a user in response to execution of a mobile application or desktop application associated with the financial institution over a communication network, the first GUI including a dashboarding having content related to one or more financial accounts of the user maintained by the financial institution; causing a visual display of a second GUI superimposed on the first GUI, the second GUI including a chat window to facilitate a virtual chat communication session between the user and a virtual support agent of the financial institution; receiving, from the client device contemporaneously with the virtual chat communication session, a command to modify an aesthetic appearance of the chat window; and dynamically modifying the aesthetic appearance of the chat window in response to the command and contemporaneously with the virtual chat communication session.

In accordance with each respective computer-implemented method, each command comprises a verbal command.

In accordance with each respective computer-implemented method, further comprising, by the one or more financial institution servers, executing natural language processing (NLP) of each verbal command.

In accordance with each respective computer-implemented method, each command comprises a textual command.

In accordance with each respective computer-implemented method, further comprising, by the one or more financial institution servers, executing natural language processing (NLP) of each textual command.

In accordance with each respective computer-implemented method, further comprising generating, by the one or more financial institution servers in response to the NLP and contemporaneously with the virtual chat communication session, a response to the command.

In accordance with each respective computer-implemented method, further comprising transmitting, by the one or more financial institution servers, a chat message presented by the virtual support agent, the chat message containing the generated response.

In accordance with each respective computer-implemented method, the generated response comprises an acknowledgement of the command.

In accordance with each respective computer-implemented method, the generated response comprises a query requesting that the user confirm the command.

In accordance with each respective computer-implemented method, the generated response comprises one or more probing questions.

In accordance with each respective computer-implemented method, the command comprises a command to modify a size (i.e., minimize or maximize) of the chat window.

In accordance with each respective computer-implemented method, further comprising, by the one or more financial institution servers, dynamically modifying the size of the chat window in response to the command and contemporaneously with the virtual chat communication session.

In accordance with each respective computer-implemented method, further comprising enabling, by the one or more financial institution servers in response to the command to modify a size (i.e., minimize or maximize) of the chat window and contemporaneously with the virtual chat communication session, the user to manipulate the chat window in a manner which dynamically modifies the size of the chat window to a desired size.

In accordance with each respective computer-implemented method, further comprising generating, by the one or more financial institution servers in response to the command to modify a size (i.e., minimize or maximize) of the chat window and contemporaneously with the virtual chat communication session, a response comprising a query as to the desired size for the chat window; receiving, by the one or more financial institution servers, a user response to the query that includes the desired size; and dynamically modifying, by the one or more financial institution servers in response to the user response and contemporaneously with the virtual chat communication session, the general shape of the chat window to the desired size.

In accordance with each respective computer-implemented method, the command comprises a command to modify a geometric configuration of the chat window.

In accordance with each respective computer-implemented method, further comprising, by the one or more financial institution servers, dynamically modifying the geometric configuration of the chat window in response to the command and contemporaneously with the virtual chat communication session.

In accordance with each respective computer-implemented method, further comprising enabling, by the one or more financial institution servers in response to the command to modify a geometric configuration of the chat window and contemporaneously with the virtual chat communication session, the user to manipulate the chat window in a manner which dynamically modifies the geometric configuration of the chat window to a desired geometric configuration.

In accordance with each respective computer-implemented method, further comprising generating, by the one or more financial institution servers in response to the command to modify a geometric configuration of the chat window and contemporaneously with the virtual chat communication session, a response comprising a query as to the desired geometric configuration for the chat window; receiving, by the one or more financial institution servers, a user response to the query that includes the desired geometric configuration; and dynamically modifying, by the one or more financial institution servers in response to the user response and contemporaneously with the virtual chat communication session, the geometric configuration of the chat window to the desired geometric configuration.

In accordance with each respective computer-implemented method, the command comprises a command to modify a general shape of the chat window.

In accordance with each respective computer-implemented method, further comprising, by the one or more financial institution servers, dynamically modifying the general shape of the chat window in response to the command and contemporaneously with the virtual chat communication session.

In accordance with each respective computer-implemented method, further comprising enabling, by the one or more financial institution servers in response to the command to modify a general shape of the chat window and contemporaneously with the virtual chat communication session, the user to modify the general shape of the chat window to a desired shape.

In accordance with each respective computer-implemented method, further comprising generating, by the one or more financial institution servers in response to the command to modify a general shape of the chat window and contemporaneously with the virtual chat communication session, a response comprising a query as to the desired type of shape for the chat window; receiving, by the one or more financial institution servers, a user response to the query that includes the desired shape; and dynamically modifying, by the one or more financial institution servers in response to the user response and contemporaneously with the virtual chat communication session, the general shape of the chat window to the desired shape.

In accordance with each respective computer-implemented method, the command comprises a command to reshape a portion of the chat window.

In accordance with each respective computer-implemented method, further comprising, by the one or more financial institution servers, dynamically reshaping a portion of the chat window in response to the command and contemporaneously with the virtual chat communication session.

In accordance with each respective computer-implemented method, further comprising enabling, by the one or more financial institution servers in response to the command to reshape a portion of the chat window and contemporaneously with the virtual chat communication session, the user to reshape a portion of the chat window to a desired shape.

In accordance with each respective computer-implemented method, further comprising generating, by the one or more financial institution servers in response to the command to reshape a portion of the chat window and contemporaneously with the virtual chat communication session, a response comprising a query as to the desired type of shape for the portion of the chat window; receiving by the one or more financial institution servers, a user response to the query that includes the desired shape; and dynamically modifying, by the one or more financial institution servers in response to the user response and contemporaneously with the virtual chat communication session, the general shape of the portion of the chat window to the desired shape.

In accordance with each respective computer-implemented method, the portion of the chat window is reshaped in a manner that enables the user to view content visually displayed on a dashboard visually displayed on a background of the user interface, and the content is associated with one or more financial accounts of the user that are maintained by the financial institution.

In accordance with each respective computer-implemented method, the command comprises a command to change the spatial orientation of the chat window relative to a dashboard associated with the financial institution that is visually displayed on a background of the user interface.

In accordance with each respective computer-implemented method, further comprising, by the one or more financial institution servers, dynamically adjusting the spatial orientation of the chat window in response to the command and contemporaneously with the virtual chat communication session.

In accordance with each respective computer-implemented method, further comprising enabling, by the one or more financial institution servers in response to the command to change the spatial orientation of the chat window and contemporaneously with the virtual chat communication session, the user to change the spatial orientation of the chat window to a desired spatial orientation.

In accordance with each respective computer-implemented method, further comprising generating, by the one or more financial institution servers in response to the command to change the spatial orientation of the chat window and contemporaneously with the virtual chat communication session, a response comprising a query as to the desired spatial orientation of the chat window; receiving, by the one or more financial institution servers, a user response to the query that includes the desired spatial orientation; and dynamically changing, by the one or more financial institution servers in response to the user response and contemporaneously with the virtual chat communication session, the spatial orientation of the chat window to the desired spatial orientation.

In accordance with each respective computer-implemented method, the spatial orientation of the chat window is changed in a manner that enables the user to view content visually displayed on the dashboard, and the content is associated with one or more financial accounts of the user that are maintained by the financial institution.

In accordance with each respective computer-implemented method, the command comprises a command to change a background color of the chat window.

In accordance with each respective computer-implemented method, further comprising, by the one or more financial institution servers, dynamically changing the background color of the chat window in response to the command and contemporaneously with the virtual chat communication session.

In accordance with each respective computer-implemented method, further comprising enabling, by the one or more financial institution servers in response to the command to change the background color of the chat window and contemporaneously with the virtual chat communication session, the user to change the background color of the chat window to a desired background color.

In accordance with each respective computer-implemented method, further comprising generating, by the one or more financial institution servers in response to the command to change the background color of the chat window and contemporaneously with the virtual chat communication session, a response comprising a query as to the desired background color of the chat window; receive a user response to the query that includes the desired background color; and dynamically change, in response to the user response and contemporaneously with the virtual chat communication session, the background color of the chat window to the desired background color.

In accordance with each respective computer-implemented method, the command comprises a command to change a background shading of the chat window.

In accordance with each respective computer-implemented method, further comprising, by the one or more financial institution servers, dynamically changing the background shading of the chat window in response to the command and contemporaneously with the virtual chat communication session.

In accordance with each respective computer-implemented method, further comprising enabling, by the one or more financial institution servers in response to the command to change the background shading of the chat window and contemporaneously with the virtual chat communication session, the user to change the background shading of the chat window to a desired background shading.

In accordance with each respective computer-implemented method, further comprising generating, by the one or more financial institution servers in response to the command to change the background shading of the chat window and contemporaneously with the virtual chat communication session, a response comprising a query as to the desired background shading of the chat window; receiving by the one or more financial institution servers, a user response to the query that includes the desired background shading; and dynamically changing, by the one or more financial institution servers in response to the user response and contemporaneously with the virtual chat communication session, the background shading of the chat window to the desired background shading.

In accordance with each respective computer-implemented method, the command comprises a command to change a text effect of the chat window.

In accordance with each respective computer-implemented method, further comprising, by the one or more financial institution servers, dynamically changing the text effect of the chat window in response to the command and contemporaneously with the virtual chat communication session.

In accordance with each respective computer-implemented method, further comprising enabling, by the one or more financial institution servers in response to the command to change the text effect of the chat window and contemporaneously with the virtual chat communication session, the user to change the text effect of the chat window to a desired background shading.

In accordance with each respective computer-implemented method, further comprising generating, by the one or more financial institution servers in response to the command to change the text effect of the chat window and contemporaneously with the virtual chat communication session, a response comprising a query as to the desired text effect of the chat window; receiving by the one or more financial institution servers, a user response to the query that includes the desired text effect; and dynamically changing, by the one or more financial institution servers in response to the user response and contemporaneously with the virtual chat communication session, the text effect of the chat window to the desired text effect.

In accordance with each respective computer-implemented method, In accordance with each respective computer-implemented method, further comprising, by the one or more financial institution servers, receiving, from the client device contemporaneously with the virtual chat communication session, a command to save the modified aesthetic appearance of the chat window as a default setting, and saving, in response to the command, the modified aesthetic appearance of the chat window as a default setting.

DRAWINGS

The various advantages of the exemplary embodiments will become apparent to one skilled in the art by reading the following specification and appended claims, and by referencing the following drawings, in which:

FIG. 5 illustrates a virtual chat communication session between a user and a virtual support agent, in accordance with one or more embodiments set forth and described herein.

Figure 1:
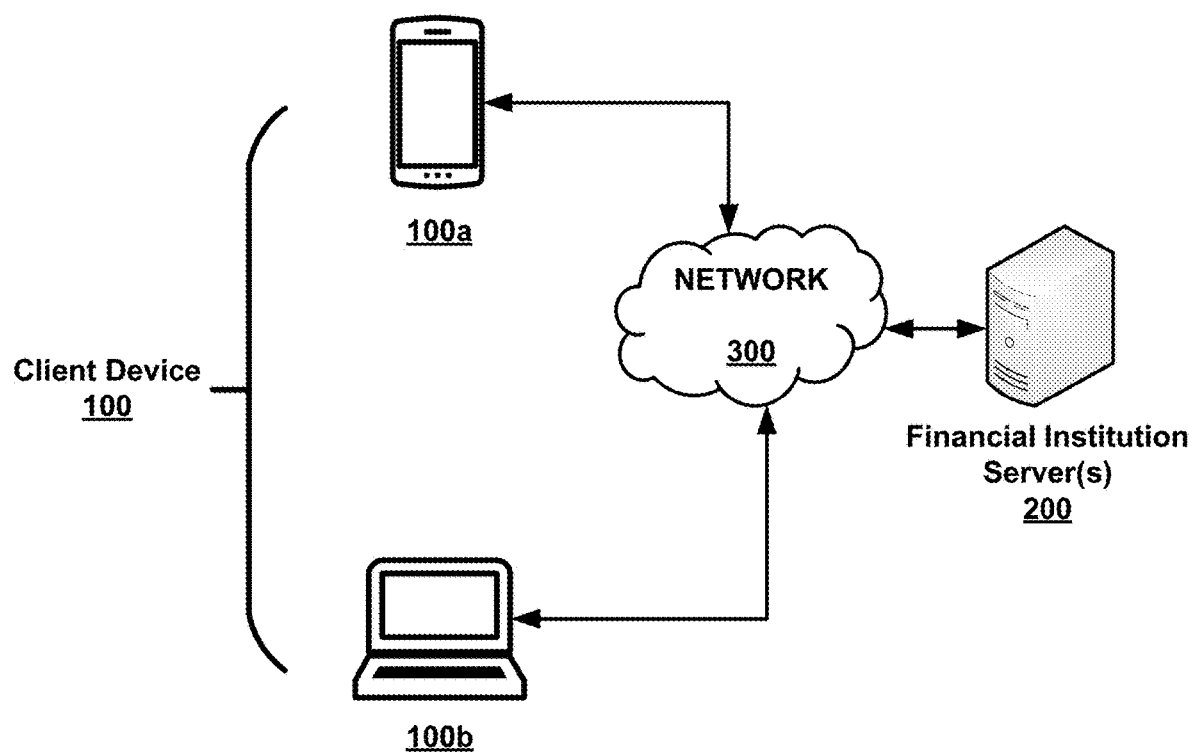
FIG. 1 illustrates a communication environment, in accordance with one or more embodiments set forth and described herein.

FIGS. 6 through 11 respectively illustrate a computer-implemented method, in accordance with one or more embodiments set forth and described herein.

DESCRIPTION

Hereinbelow are example definitions that are provided only for illustrative purposes in this disclosure, and should not be construed to limit the scope of the one or more embodiments disclosed herein in any manner. Some terms are defined below for purposes of clarity. These terms are not rigidly restricted to these definitions. This disclosure contemplates that these terms and other terms may also be defined by their use in the context of this description.

As used herein, "application" relates to software used on a computer (usually by a client and/or client device and can be applications that are targeted or supported by specific classes of machine, such as a mobile application, desktop application, tablet application, and/or enterprise application (e.g., client device application(s) on a client device). Applications may be separated into applications which reside on a client device (e.g., VPN, PowerPoint, Excel) and cloud applications which may reside in the cloud (e.g., Gmail, GitHub). Cloud applications may correspond to applications on the client device or may be other types such as social media applications (e.g., Facebook).

As used herein, "artificial intelligence (AI)" relates to one or more computer system operable to perform one or more tasks that normally require human intelligence, such as visual perception, speech recognition, decision-making, and translation between languages.

As used herein, "machine learning" relates to an application of AI that provides computer systems the ability to automatically learn and improve from data and experience without being explicitly programmed.

As used herein, "computer" relates to a single computer or to a system of interacting computers. A computer is a combination of a hardware system, a software operating system and perhaps one or more software application programs. Examples of a computer include without limitation a personal computer (PC), laptop computer, a smart phone, a cell phone, or a wireless tablet.

As used herein, "client device" relates to any device associated with a user, including personal computers, laptops, tablets, and/or mobile smartphones.

As used herein, "modules" relates to either software modules (e.g., code embodied on a machine-readable medium or in a transmission signal) or hardware modules. Certain embodiments are described herein as including logic or a number of components, modules, or mechanisms. A "hardware module" (or just "hardware") as used herein is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein. In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as an FPGA or an ASIC. A hardware module may also include programmable logic or circuitry that is temporarily configured by software to perform certain operations. A hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations. Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time. Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access.

As used herein, "network" or "networks" relates to any combination of electronic communication networks, including without limitation the Internet, a local area network (LAN), a wide area network, a wireless network, and a cellular network (e.g., 4G, 5G).

As used herein, "processes" or "methods" are presented in terms of processes (or methods) or symbolic representations of operations on data stored as bits or binary digital signals within a machine memory (e.g., a computer memory). These processes or symbolic representations are examples of techniques used by those of ordinary skill in the data processing arts to convey the substance of their work to others skilled in the art. As used herein, a "process" is a self-consistent sequence of operations or similar processing leading to a desired result. In this context, processes and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information.

As used herein, "processor-Implemented module" relates to a hardware module implemented using one or more processors. The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein.

As used herein, "server" relates to a server computer or group of computers that acts to provide a service for a certain function or access to a network resource. A server may be a physical server, a hosted server in a virtual environment, or software code running on a platform.

As used herein, "service" or "application" relates to an online server (or set of servers), and can refer to a web site and/or web application.

As used herein, "software" relates to a set of instructions and associated documentations that tells a computer what to do or how to perform a task. Software includes all different software programs on a computer, such as applications and the operating system. A software application could be written in substantially any suitable programming language, which could easily be selected by one of ordinary skill in the art. The programming language chosen should be compatible with the computer by which the software application is to be executed and, in particular, with the operating system of that computer. Examples of suitable programming languages include without limitation Object Pascal, C, C++, CGI, Java, and Java Scripts. Further, the functions of some embodiments, when described as a series of steps for a method, could be implemented as a series of software instructions for being operated by a processor, such that the embodiments could be implemented as software, hardware, or a combination thereof.

As used herein, "sensor" relates to any device, component and/or system that can perform one or more of detecting, determining, assessing, monitoring, measuring, quantifying, and sensing something.

As used herein, "real-time" relates to a level of processing responsiveness that a user, module, or system senses as sufficiently immediate for a particular process or determination to be made, or that enables the processor to keep up with some external process.

As used herein, "user" relates to a consumer, machine entity, and/or requesting party, and may be human or machine.

In accordance with one or more embodiments set forth, illustrated, and described herein, a chat support platform is provided for a client device of a user having one or more financial accounts residing at one or more financial institution servers of a financial institution. The chat support platform facilitates a more enhanced chat experience by enabling the dynamic modification of the general aesthetic appearance or configuration of the chat window by user command or request contemporaneously with a virtual chat communication session between a virtual support agent of a financial institution and a user on a client device.

For instance, during the virtual chat communication session, the user may request/command, via a client device, to change one or more aspects of the general aesthetic appearance or configuration of the chat window. This may be done or several reasons. For instance, the user may be visually impaired, and thus, desires to change the general aesthetic appearance or configuration of the chat window in a manner that makes it easier to see the textual content of the chat messages. The user may have a general desire to change the general aesthetic appearance or configuration of the chat window to convey some artistic meaning the user has. The user may have a general desire to change the general aesthetic appearance or configuration of the chat window to influence the mood of the user. The user may have a general desire to change the general aesthetic appearance or configuration of the chat window in order to have the ability to see content that is visually displayed on a background graphical user interface (e.g., the digital dashboard of the financial institution.

Turning to the figures, in which FIG. 1 illustrates a communication environment that facilitates communications between a user and a financial institution. A client device 100 of a user (financial account holder), operating in the communication environment, facilitates user access to and user management of one or more financial accounts residing at one or more financial institution servers 200 of the financial institution. The communication environment includes the client device 100, the one or more financial institution servers 200, and a communication network 300 through which communication is facilitated between the client device 100 and the one or more financial institution servers 200.

In accordance with one or more embodiments set forth, described, and/or illustrated herein, the client device 100 comprises a computing device, including but not limited to a desktop computer, a laptop computer, a smart phone, a handheld personal computer, a workstation, a game console, a cellular phone, a mobile device, a personal computing device, a wearable electronic device, a smartwatch, smart eyewear, a tablet computer, a convertible tablet computer, or any other electronic, microelectronic, or micro-electromechanical device for processing and communicating data. This disclosure contemplates the client device 100 comprising any form of electronic device that optimizes or otherwise transforms the performance and functionality of the one or more embodiments in a manner that falls within the spirit and scope of the principles of this disclosure.

Figure 2:
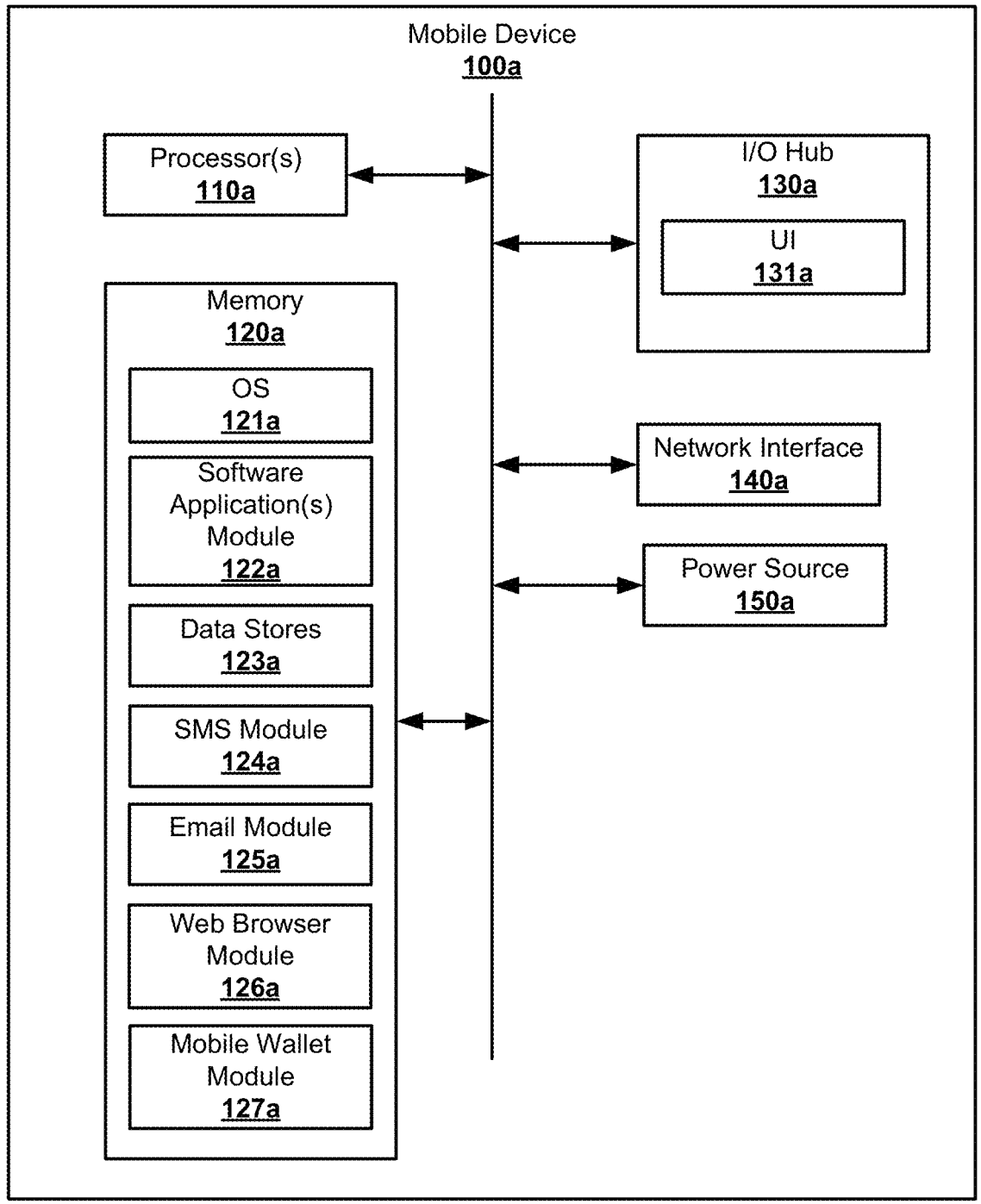
FIG. 2 illustrates a block diagram of the first client device of FIG. 1.

In the illustrated example embodiment of FIG. 2, the client device 100 comprises a mobile device 100a. Some of the possible operational elements of the mobile device 100a are illustrated in FIG. 2 and will now be described herein. It will be understood that it is not necessary for the mobile device 100a to have all the elements illustrated in FIG. 2. For example, the mobile device 100a may have any combination of the various elements illustrated in FIG. 2. Moreover, the mobile device 100a may have additional elements to those illustrated in FIG. 2.

The mobile device 100a includes one or more processors 110a, a non-transitory memory 120a operatively coupled to the one or more processors 110a, an I/O hub 130a, a network interface 140a, and a power source 150a.

The memory 120a comprises a set of instructions of computer-executable program code. The set of instructions are executable by the one or more processors 110a to cause execution of an operating system 121a and one or more software applications of a software application module 122a that reside in the memory 120a. The one or more software applications residing in the memory 120a includes, but is not limited to, a financial institution application that is associated with the financial institution. The financial institution application comprises a mobile application that facilitates establishment of a secure connection between the mobile device 100a and the one or more financial institution servers 200. The one or more processors 110a are operable to execute the mobile application to facilitate user access to the one or more financial accounts and user management of the one or more financial accounts.

The memory 120a also includes one or more data stores 123a that are operable to store one or more types of data. The mobile device 100a may include one or more interfaces that facilitate one or more systems or modules thereof to transform, manage, retrieve, modify, add, or delete, the data residing in the data stores 123a. The one or more data stores 123a may comprise volatile and/or non-volatile memory. Examples of suitable data stores 123a include, but are not limited to RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable non-transitory storage medium, or any combination thereof. The one or more data stores 123a may be a component of the one or more processors 110a or alternatively, may be operatively connected to the one or more processors 110a for use thereby. As set forth, described, and/or illustrated herein, "operatively connected" may include direct or indirect connections, including connections without direct physical contact.

The memory 120a also includes an SMS module 124a operable to facilitate user transmission and receipt of text messages via the mobile device 100a though the network 300. In one example embodiment, the user may receive text messages from the financial institution that are associated with the user access and the user management of the one or more financial accounts. An email module 125a is operable to facilitate user transmission and receipt of email messages via the mobile device 100a through the network 300. In one example embodiment, the user may receive email messages from the financial institution that are associated with the user access and the user management of the one or more financial accounts. The user may utilize a web browser module 126a that is operable to facilitate user access to one or more websites associated with the financial institution through the network 300. A digital wallet module 127a facilitates the generation of one or more digital wallets associated with the one or more financial accounts.

In accordance with one or more embodiments set forth, described, and/or illustrated herein, the mobile device 100a includes an I/O hub 130a operatively connected to other systems and subsystems of the mobile device 100a. The I/O system 130a may include one or more of an input interface, an output interface, and a network controller to facilitate communications between the mobile device 100a and the one or more financial institution servers 200. The input interface and the output interface may be integrated as a single, unitary user interface 131a, or alternatively, be separate as independent interfaces that are operatively connected.

As used herein, the input interface is defined as any device, software, component, system, element, or arrangement or groups thereof that enable information and/or data to be entered as input commands by a user in a manner that directs the one or more processors 110a to execute instructions. The input interface may comprise a user interface (UI), a graphical user interface (GUI), such as, for example, a display, human-machine interface (HMI), or the like. Embodiments, however, are not limited thereto, and thus, this disclosure contemplates the input interface comprising a keypad, touch screen, multi-touch screen, button, joystick, mouse, trackball, microphone and/or combinations thereof.

As used herein, the output interface is defined as any device, software, component, system, element or arrangement or groups thereof that enable information/data to be presented to a user. The output interface may comprise one or more of a visual display or an audio display, including, but not limited to, a microphone, earphone, and/or speaker. One or more components of the mobile device 100a may serve as both a component of the input interface and a component of the output interface.

The mobile device 100a also includes a network interface 140a operable to facilitate connection to the network 300. The mobile device 100a further includes a power source 150a that comprises a wired powered source, a wireless power source, a replaceable battery source, or a rechargeable battery source.

Figure 3:
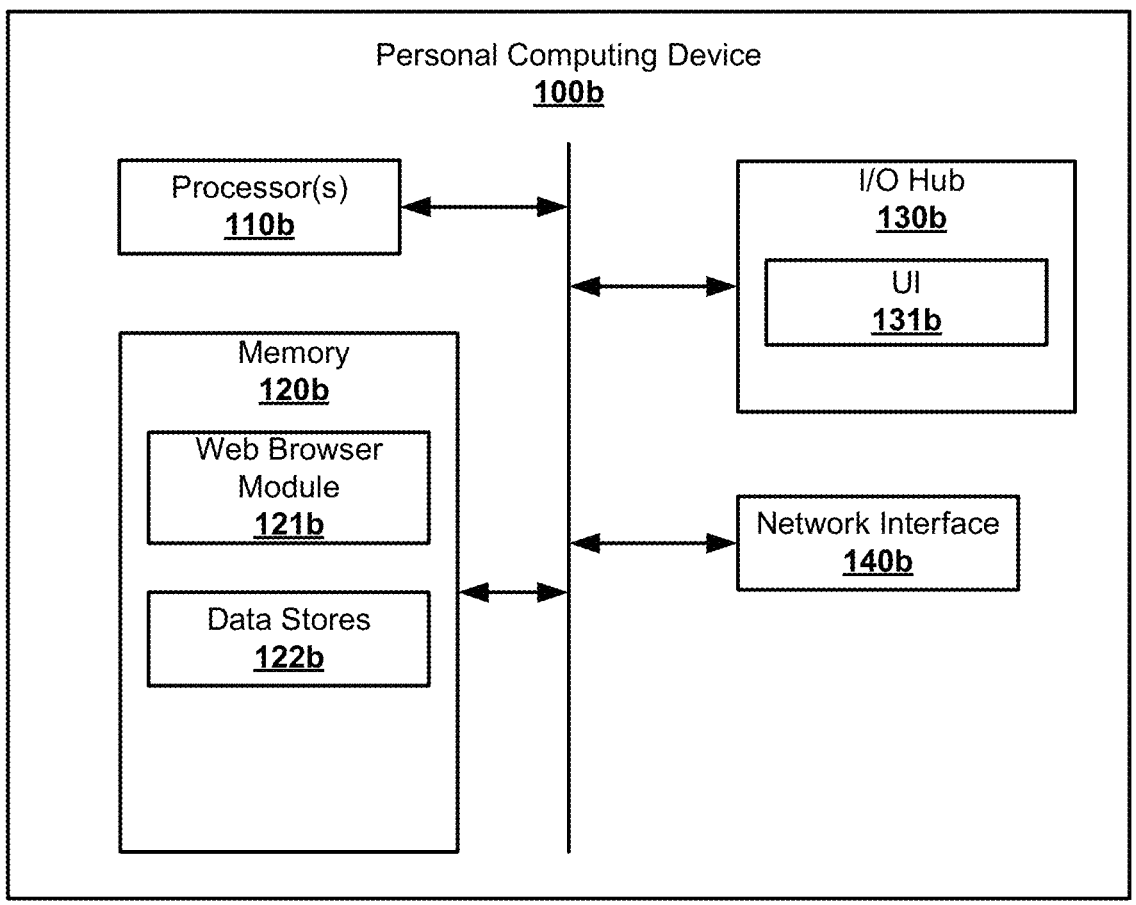
FIG. 3 illustrates a block diagram of the second client device of FIG. 1.

In the illustrated example embodiment of FIG. 3, the client device 100 comprises a personal computing device 100b. Some of the possible operational elements of the personal computing device 100b are illustrated in FIG. 3 and will now be described herein. It will be understood that it is not necessary for the personal computing device 100b to have all the elements illustrated in FIG. 3. For example, the personal computing device 100b may have any combination of the various elements illustrated in FIG. 3. Moreover, the personal computing device 100b may have additional elements to those illustrated in FIG. 3.

The personal computing device 100b includes one or more processors 110b, a non-transitory memory 120b operatively coupled to the one or more processors 110A, an I/O hub 130b, and a network interface 140b.

The memory 120b comprises a set of instructions of computer-executable program code. The set of instructions are executable by the one or more processors 110b to cause control of the web browser module 121b in a manner that facilitates user access to a web browser having one or more websites associated with the financial institution through the network 300.

The memory 120*b* also includes one or more data stores 122*b* that are operable to store one or more types of data. The personal computing device 100*b* may include one or more interfaces that facilitate one or more systems or modules thereof to transform, manage, retrieve, modify, add, or delete, the data residing in the data stores 122*b*. The one or more data stores 122*b* may comprise volatile and/or non-volatile memory. Examples of suitable data stores 122*b* include, but are not limited to RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable non-transitory storage medium, or any combination thereof. The one or more data stores 122*b* may be a component of the one or more processors 110*b*, or alternatively, may be operatively connected to the one or more processors 110*b* for use thereby. As set forth, described, and/or illustrated herein, "operatively connected" may include direct or indirect connections, including connections without direct physical contact.

In accordance with one or more embodiments set forth, described, and/or illustrated herein, "processor" means any component or group of components that are operable to execute any of the processes described herein or any form of instructions to carry out such processes or cause such processes to be performed. The one or more processors 100*b* may be implemented with one or more general-purpose and/or one or more special-purpose processors. Examples of suitable processors include graphics processors, microprocessors, microcontrollers, DSP processors, and other circuitry that may execute software. Further examples of suitable processors include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller. The one or more processors 110*b* may comprise at least one hardware circuit (e.g., an integrated circuit) operable to carry out instructions contained in program code. In embodiments in which there is a plurality of processors, such processors may work independently from each other, or one or more processors may work in combination with each other.

In accordance with one or more embodiments set forth, described, and/or illustrated herein, the personal computing device 100*b* includes an I/O hub 130*b* operatively connected to other systems and subsystems of the personal computing device 100*b*. The I/O system 130*b* may include one or more of an input interface, an output interface, and a network controller to facilitate communications between the personal computing device 100*b* and the one or more financial institution servers 200. The input interface and the output interface may be integrated as a single, unitary user interface 131*b*, or alternatively, be separate as independent interfaces that are operatively connected.

As used herein, the input interface is defined as any device, software, component, system, element, or arrangement or groups thereof that enable information and/or data to be entered as input commands by a user in a manner that directs the one or more processors 110*b* to execute instructions. The input interface may comprise a user interface (UI), a graphical user interface (GUI), such as, for example, a display, human-machine interface (HMI), or the like. Embodiments, however, are not limited thereto, and thus, this disclosure contemplates the input interface comprising a keypad, touch screen, multi-touch screen, button, joystick, mouse, trackball, microphone and/or combinations thereof.

As used herein, the output interface is defined as any device, software, component, system, element or arrangement or groups thereof that enable information/data to be presented to a user. The output interface may comprise one or more of a visual display or an audio display, including, but not limited to, a microphone, earphone, and/or speaker. One or more components of the personal computing device 100*b* may serve as both a component of the input interface and a component of the output interface.

The personal computing device 100*b* also includes a network interface 140*b* operable to facilitate connection to the network 300.

Figure 4:
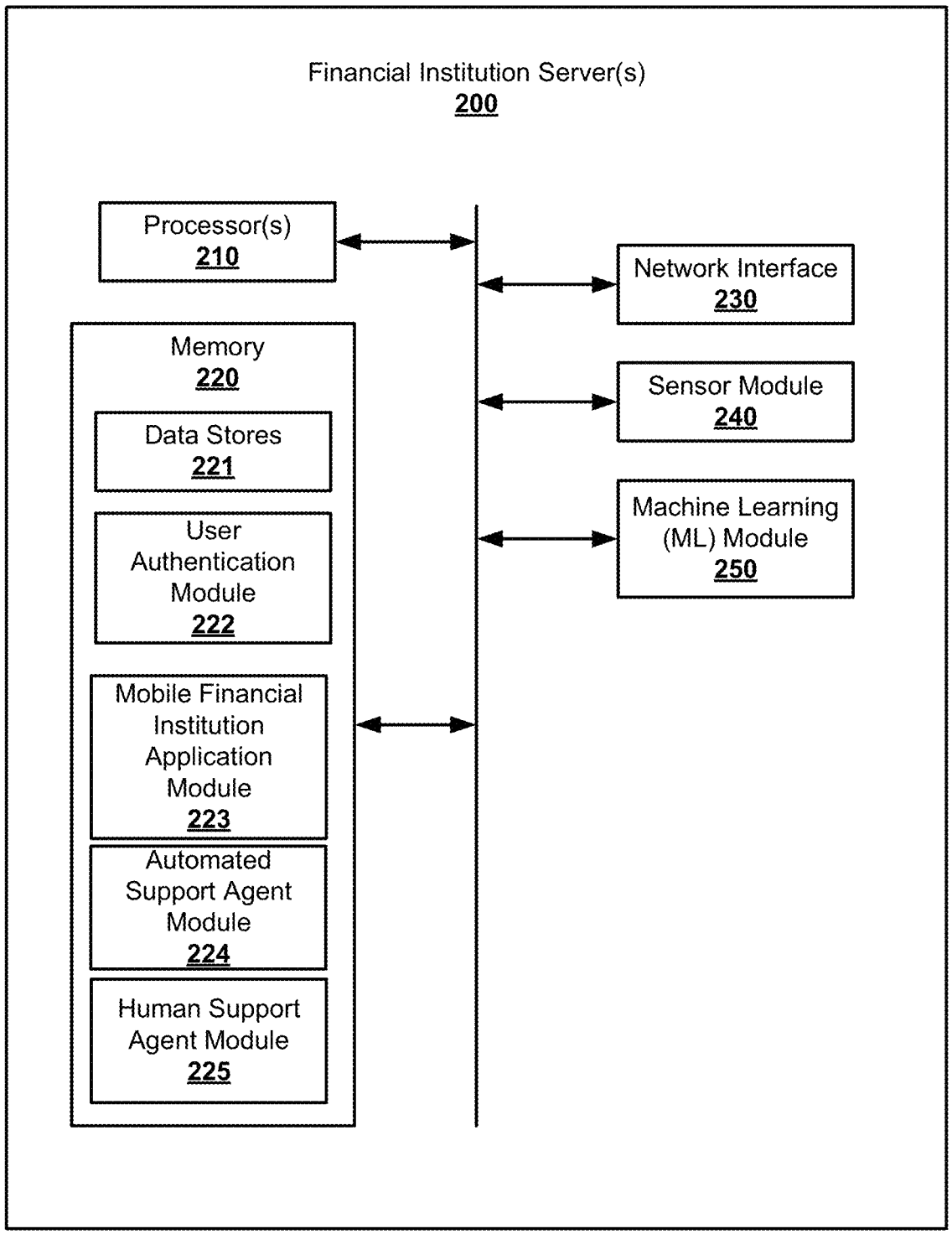
FIG. 4 illustrates a block diagram of the one or more financial institution servers of FIG. 1.

As illustrated in FIG. 4, the one or more financial institution servers 200 includes one or more processors 210, a non-transitory memory 220 operatively coupled to the one or more processors 210, a network interface 230, a sensor module 240, and a machine learning (ML) module 250. Some of the possible operational elements of each server in the one or more financial institution servers 200 are illustrated in FIG. 4 and will now be described herein. It will be understood that it is not necessary for each server in the one or more financial institution servers 200 to have all the elements illustrated in FIG. 4. For example, each server in the one or more financial institution servers 200 may have any combination of the various elements illustrated in FIG. 4. Moreover, each server in the one or more financial institution servers 200 may have additional elements to those illustrated in FIG. 4.

The one or more financial institution servers 200 may be controlled by a system manager (or policy manager) of the financial institution.

In accordance with one or more embodiments set forth, described, and/or illustrated herein, the one or more financial institution servers 200 may comprise a computing device, including but not limited to a server computer, a desktop computer, a laptop computer, a smart phone, a handheld personal computer, a workstation, a game console, a cellular phone, a mobile device, a personal computing device, a wearable electronic device, a smartwatch, smart eyewear, a tablet computer, a convertible tablet computer, or any other electronic, microelectronic, or micro-electromechanical device for processing and communicating data. This disclosure contemplates the one or more financial institution servers 200 comprising any form of electronic device that optimizes or otherwise transforms the performance and functionality of the one or more embodiments in a manner that falls within the spirit and scope of the principles of this disclosure.

The memory 220 comprises a set of instructions of computer-executable program code. The set of instructions are executable by the one or more processors 210 in manner that facilitates control of a user authentication module 222, a mobile financial institution application module 223 having one or more mobile financial institution applications that reside in the memory 220, an automated support agent module 224, and a human support agent module 225. In accordance with one or more embodiments set forth, described, and/or illustrated herein, the one or more financial institution servers 200 may individually or collectively execute the instructions to perform any one or more of the methodologies set forth, described, and illustrated herein. The virtual support agent module 224 may execute natural language processing (NLP) based on natural language input by the user via the client device 100 in response to one or more probing questions presented by the automated virtual support agent.

The memory 220 also includes one or more data stores 221 that are operable to store one or more types of data, including but not limited to, user account data, user authentication data, sensor data, etc. For instance, the one or more data stores 221 may comprise a storage location on which one or more electronic files of the transcripts associated with virtual chat communications reside. The one or more data stores 221 may comprise a storage location on which a user profile settings associated with virtual chat communications reside. The one or more data stores 221 may comprise a storage location on which a user security settings associated with virtual chat communications reside. The one or more data stores 221 may comprise volatile and/or non-volatile memory. Examples of suitable data stores 221 include, but are not limited to RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable non-transitory storage medium, or any combination thereof. The one or more data stores 221 may be a component of the one or more processors 210, or alternatively, may be operatively connected to the one or more processors 210 for use thereby. As set forth, described, and/or illustrated herein, "operatively connected" may include direct or indirect connections, including connections without direct physical contact.

The memory 220 may include a single machine-readable medium, or a plurality of media (e.g., a centralized or distributed database, or associated caches and servers) operable to store the instructions. The term "machine-readable medium" shall also be taken to include any medium, or combination of multiple media, that is capable of storing instructions (e.g., software) for execution by a server (e.g., server), such that the instructions, when executed by the one or more processors 210, cause the one or more financial institution servers 200 to perform any one or more of the methodologies set forth, described, and illustrated herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory, an optical medium, a magnetic medium, or any suitable combination thereof.

The computer-executable program code may instruct the one or more processors 210 to cause the user authentication module 221 to authenticate a user in order to gain user access to the one or more financial accounts. The user authentication module 221 may be caused to request user input user data or user identification that include, but are not limited to, user identity (e.g., username), a user passcode, a cookie, user biometric data, a private key, a token, and/or another suitable authentication data or information.

The computer-executable program code may instruct the one or more processors 210 to execute certain logic, data-processing, and data-storing functions of the one or more financial institution servers 200, in addition to certain communication functions of the one or more financial institution servers 200. The one or more mobile financial institution applications of the mobile financial institution application module 222 are operable to communicate with the client device 100 in a manner which facilitates user access to the one or more financial accounts in addition to user management of the one or more financial accounts based on successful user authentication.

The sensor module 240 is operable, at least during execution of the mobile application by the client device 100, to dynamically detect, determine, assess, monitor, measure, quantify, and/or sense information about the client device 100. The sensor module 240 may be operable to detect, determine, assess, monitor, measure, quantify and/or sense in real-time. The sensor module 240 may be operable to detect, determine, assess, monitor, measure, quantify, and/or sense geographic location information about the geographic location of the client device 100.

The ML module 250 may include one or more ML algorithms to train one or more machine learning models of the one or more financial institution servers 200 based on chat data, human support agent data, user financial data, and/or information resided in the memory 220. The ML algorithms may include one or more of a linear regression algorithm, a logical regression algorithm, or a combination of different algorithms. A neural network may also be used to train the system based on the received data. The ML module 250 may analyze the received data and/or information, and transform the data and/or information in a manner which provides enhanced communication between the client device 100 and the one or more financial institution servers 200, while also enhancing user access and management of the one or more financial accounts. The data and/or information may also be up-linked to other systems and modules in the one or more financial institution servers 200 for further processing to discover additional information that may be used to enhance the understanding of the information.

In accordance with one or more embodiments set forth, described, and/or illustrated herein, the network 300 may comprise a wireless network, a wired network, or any suitable combination thereof. For example, the network 300 is operable to support connectivity using any protocol or technology, including, but not limited to wireless cellular, wireless broadband, wireless local area network (WLAN), wireless personal area network (WPAN), wireless short distance communication, Global System for Mobile Communication (GSM), or any other suitable wired or wireless network operable to transmit and receive a data signal.

In accordance with one or more embodiments set forth, described, and/or illustrated herein, a user may, via the client device 100, execute a mobile application or a desktop application associated with the financial institution over the communication network 300.

As illustrated in FIG. 5, upon a user launching the mobile application or the desktop application on the client device 100, and being authenticated by the user authentication module 221, the computer-executable program code may instruct the one or more processors 210 to cause a display of a graphical user interface (GUI) on the user interface 131*a*, 131*b* of the client device 100. The GUI comprises a chat window or interface 500 that facilitates a virtual chat communication session in natural language communicated verbally and/or textually with a virtual support agent (e.g., an automated virtual support agent or a human virtual support agent). The automated virtual support agent may comprise a chatbot. The user may input text messages via a text input field 501 that are to be processed by the one or more financial institution servers 200 (e.g., via one or more of the automated support agent module 224, the human support agent module 225, and the ML module 250). The virtual chat communication session includes a plurality of chat messages 502-510 visually displayed in chat bubbles between the user and the virtual support agent. The chat messages may be in verbal form or textual form.

During the virtual chat communication session, the user, via the client device 100, may transmit a chat message 503 in the form of a request/command (e.g., a verbal command or a textual command) to change, modify, or otherwise adjust an aesthetic appearance of the chat window 500. In the illustrated example embodiment of FIG. 5, the user transmits a request/command to modify the general shape of the chat window. Embodiments, however, are not limited thereto. This disclosure contemplates other changes to the aesthetic appearance of the chat window 500. For instance, such changes to the aesthetic appearance of the chat window 500 include, but are not limited to, reshaping a portion of the chat window 500, changing the spatial orientation of the chat window 500 relative to a dashboard associated with the financial institution that is visually displayed on a background of the user interface 131a 131b, changing a background color of the chat window 500, changing a background shading of the chat window 500, changing a text effect of the chat window 500, etc. Some changes may be executed in an attempt to enable the user to view content visually displayed on a dashboard visually displayed on a background of the user interface 131a, 131b. The content may be associated with one or more financial accounts of the user that are maintained by the financial institution. For instance, the user may wish to see an account balance or a financial transaction (in list showing the financial transaction history) during the virtual chat communication session. A user, via the client device 100, may transmit a request/command to one or more changes in the aesthetic appearance of the chat window 500. In response to the request/command, the computer-executable program code may instruct the one or more processors 210 to execute such changes in parallel (i.e., simultaneously).

In response to the request/command, the computer-executable program code may instruct the one or more processors 210 to execute natural language processing (NLP) of the request/command contained in the chat message 503. This will be executed for all chat messages transmitted by the user via the client device 100.

In response to the request/command and based on the NLP, the computer-executable program code may instruct the one or more processors 210 to generate a response to the request/command. The computer-executable program code may then instruct the one or more processors 210 to transmit a response in the form of a chat message 504 that includes the generated response to the request/command. In the illustrated example embodiment of FIG. 5, the response comprises an acknowledgement of the request/command and a request for the user to confirm the same. The user transmits the confirmation in the form of chat message 505.

In response to receiving confirmation from the user via the client device 100, the computer-executable program code may instruct the one or more processors 210 to generate another response. The computer-executable program code may then instruct the one or more processors 210 to transmit a query in the form of a chat message 506 that asks the user for the specific type of change to the aesthetic appearance of the chat window 500 the user desires. In the illustrated example embodiment of FIG. 5, the response comprises an acknowledgement of the request/command and a request for the user to confirm the same.

In response to receipt of the desired change (in the form of chat message 507) and based on NLP of the same, the computer-executable program code may instruct the one or more processors 210 to generate a response to the chat message 507. The computer-executable program code may then instruct the one or more processors 210 to transmit a response in the form of a chat message 508 that includes the generated response. In the illustrated example embodiment of FIG. 5, the response comprises an acknowledgement of the desired change and a request for the user to confirm the same. The user transmits the confirmation in the form of chat message 509.

In response to receipt of the confirmation (in the form of chat message 509) and based on NLP of the same, the computer-executable program code may instruct the one or more processors 210 to generate a response to the chat message 509. The computer-executable program code may then instruct the one or more processors 210 to transmit a response in the form of a chat message 510 that includes the generated response to the chat message 509. In the illustrated example embodiment of FIG. 5, the response comprises an indication to execute the change in accordance with the request/command.

In response to receipt of the desired change (in the form of chat message 507) and based on NLP of the same, the computer-executable program code may instruct the one or more processors 210 to modify the aesthetic appearance of the chat window 500 by changing the general shape of the chat window to the desired shape, i.e., a star. This change is executed contemporaneously with the virtual chat communication session.

Alternatively, the computer-executable program code may instruct the one or more processors 210 to modify the aesthetic appearance of the chat window 500 by changing the general shape (or any aesthetic feature of the chat window) of the chat window to a shape that is randomly selected by the one or more processors 210. After visual display of the random aesthetic feature, the computer-executable program code may instruct the one or more processors 210 to generate a query that request the user to confirm whether the random aesthetic feature is acceptable. Should the user transmit a response to the query that the random aesthetic feature is unacceptable, the computer-executable program code may instruct the one or more processors 210 to either modify the aesthetic appearance of the chat window 500 to an alternative random aesthetic feature, or transmit a response to the client device 100 requesting a specific type of aesthetic feature that is desired by the user.

During the virtual chat communication session, the user may also, via the client device 100, transmit a chat message in the form of a request/command (e.g., a verbal command or a textual command) to save the modified aesthetic appearance of the chat window as a default setting. In response thereto, and in response to the command, the computer-executable program code may instruct the one or more processors 210 to save the modified aesthetic appearance of the chat window as a default setting.

Alternatively, the computer-executable program code may instruct the one or more processors 210 to automatically save the modified aesthetic appearance of the chat window as a default setting without being prompted or commanded by the user.

Alternatively, the computer-executable program code may instruct the one or more processors 210 to transmit a query in the form of a chat message asking the user whether it wants to save the modified aesthetic appearance of the chat window as a default setting.

Illustrated examples shown in FIGS. 6 to 11 set forth computer-implemented methods 600, 700, 800, 900, 1000, and 1100. In one or more examples, the respective flowcharts of the computer-implemented methods 600, 700, 800, 900, 1000, and 1100 may be implemented by the one or more processors 210 of the one or more financial institution servers 200. In particular, the computer-implemented methods 600, 700, 800, 900, 1000, and 1100 may be implemented as one or more modules in a set of logic instructions stored in a non-transitory machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality hardware logic using circuit technology such as, for example, application specific integrated circuit (ASIC), complementary metal oxide semiconductor (CMOS) or transistor-transistor logic (TTL) technology, or any combination thereof.

In accordance with one or more embodiments set forth, described, and/or illustrated herein, software executed by the one or more financial institution servers 200 provides functionality described or illustrated herein. In particular, software executed by the one or more processors 210 is operable to perform one or more processing blocks of the computer-implemented methods 600, 700, 800, 900, 1000, and 1100 set forth, described, and/or illustrated herein, or provides functionality set forth, described, and/or illustrated.

Figure 6:
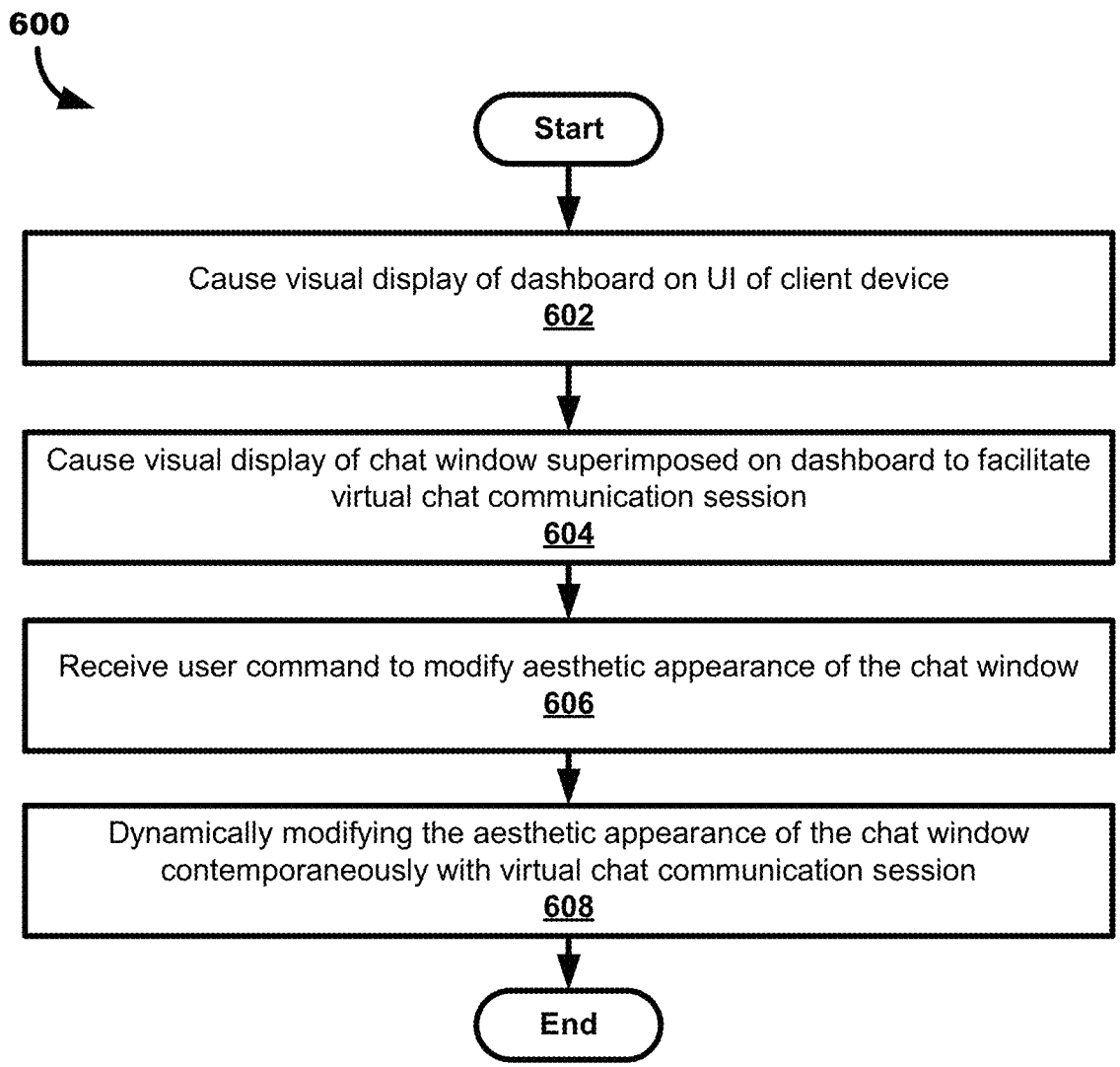

As illustrated in FIG. 6, illustrated process block 602 causing, by one or more financial institution servers 200 associated with the financial institution on a user interface 131a, 131b of a client device 100 of a user executing a mobile application or desktop application associated with the financial institution over a communication network, a visual display of a first GUI on the user interface 131a, 131b of the client device 100 of the user.

In accordance with process block 602, the first GUI comprises a dashboarding having content related to the one or more financial accounts of the user that are maintained by the financial institution.

The computer-implemented method 600 may then proceed to illustrated process block 604, which includes causing, by the one or more financial institution servers, a visual display of a second GUI superimposed on the first GUI.

In accordance with process block 604, the second GUI comprises a chat window 500 to facilitate a virtual chat communication session between the user and a virtual support agent of the financial institution.

The computer-implemented method 600 may then proceed to illustrated process block 606, which includes receiving, by the one or more financial institution servers from the client device 100 contemporaneously with the virtual chat communication session, a command to modify an aesthetic appearance of the chat window.

In accordance with process block 606, the command comprises a verbal command or a textual command.

In accordance with process block 606, the command comprises a command to modify a size (i.e., minimize or maximize) of the chat window to a desired size.

In accordance with process block 606, the command comprises a command to change the general shape of the chat window to a desired shape.

In accordance with process block 606, the command comprises a command to modify a geometric configuration of the chat window to a desired geometric configuration.

In accordance with process block 606, the command comprises a command to reshape a portion of the chat window to a desired shape.

In accordance with process block 606, the command comprises a command to change the spatial orientation of the chat window relative to the dashboard to a desired spatial orientation.

In accordance with process block 606, the command comprises a command to change a background color of the chat window to a desired color.

In accordance with process block 606, the command comprises a command to change a background shading of the chat window to a desired shading.

In accordance with process block 606, the command comprises a command to change a text effect of the chat window to a desired text effect.

The computer-implemented method 600 may then proceed to illustrated process block 608, which includes dynamically modifying the aesthetic appearance of the chat window in response to the command and contemporaneously with the virtual chat communication session.

In accordance with process block 608, dynamically modifying the aesthetic appearance of the chat window comprises dynamically modifying, by the one or more financial institution servers in response to the command and contemporaneously with the virtual chat communication session, the size of the chat window to the desired size.

In accordance with process block 608, dynamically modifying the aesthetic appearance of the chat window comprises dynamically modifying, by the one or more financial institution servers in response to the command and contemporaneously with the virtual chat communication session, the general shape of the chat window to the desired shape.

In accordance with process block 608, dynamically modifying the aesthetic appearance of the chat window comprises dynamically modifying, by the one or more financial institution servers in response to the command and contemporaneously with the virtual chat communication session, the geometric configuration of the chat window to the desired geometric configuration.

In accordance with process block 608, dynamically modifying the aesthetic appearance of the chat window comprises dynamically reshaping, by the one or more financial institution servers in response to the command and contemporaneously with the virtual chat communication session, a portion of the chat window to the desired shape.

In accordance with process block 608, dynamically modifying the aesthetic appearance of the chat window comprises dynamically changing, by the one or more financial institution servers in response to the command and contemporaneously with the virtual chat communication session, the spatial orientation of the chat window relative to the dashboard to the desired spatial orientation.

In accordance with process block 608, dynamically modifying the aesthetic appearance of the chat window comprises dynamically changing, by the one or more financial institution servers in response to the command and contemporaneously with the virtual chat communication session, the background color of the chat window to the desired color.

In accordance with process block 608, dynamically modifying the aesthetic appearance of the chat window comprises dynamically modifying, by the one or more financial institution servers in response to the command and contemporaneously with the virtual chat communication session, the background shading of the chat window to the desired shading.

In accordance with process block 608, dynamically modifying the aesthetic appearance of the chat window comprises dynamically changing, by the one or more financial institution servers in response to the command and contemporaneously with the virtual chat communication session, the text effect of the chat window to the desired text effect.

The computer-implemented method 600 may also include executing, by the one or more financial institution servers, NLP of each user command. The computer-implemented method 600 may then include generating, by the one or more financial institution servers in response to the NLP and contemporaneously with the virtual chat communication session, a response to the command. The computer-implemented method 600 may then include transmitting, by the one or more financial institution servers, a chat message presented by the virtual support agent, the chat message containing the generated response.

In accordance with the computer-implemented method 600, the generated response comprises an acknowledgement of the command.

In accordance with the computer-implemented method 600, the generated response comprises a query requesting that the user confirm the command.

In accordance with the computer-implemented method 600, the generated response comprises one or more probing questions.

The computer-implemented method 600 may terminate or end after execution of process block 608.

Figure 7:
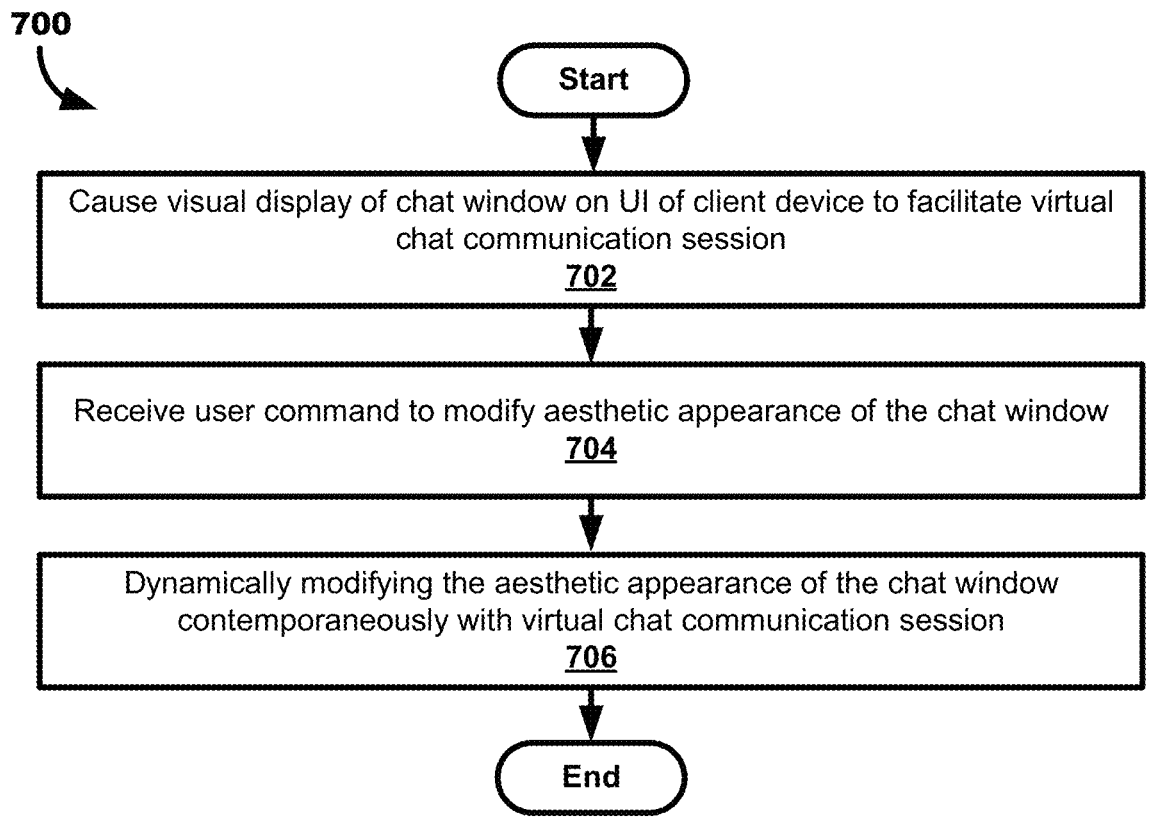

As illustrated in FIG. 7, illustrated process block 702 causing, by one or more financial institution servers 200 associated with the financial institution on a user interface 131*a*, 131*b* of a client device 100 of a user executing a mobile application or desktop application associated with the financial institution over a communication network, a visual display of a GUI comprising a chat window 500 to facilitate a virtual chat communication session between the user and a virtual support agent of the financial institution.

The computer-implemented method 700 may then proceed to illustrated process block 704, which includes receiving, by the one or more financial institution servers from the client device 100 contemporaneously with the virtual chat communication session, a command to modify an aesthetic appearance of the chat window.

In accordance with process block 704, the command comprises a verbal command or a textual command.

In accordance with process block 704, the command comprises a command to modify a size (i.e., minimize or maximize) of the chat window to a desired size.

In accordance with process block 704, the command comprises a command to change the general shape of the chat window to a desired shape.

In accordance with process block 704, the command comprises a command to modify a geometric configuration of the chat window to a desired geometric configuration.

In accordance with process block 704, the command comprises a command to reshape a portion of the chat window to a desired shape.

In accordance with process block 704, the command comprises a command to change the spatial orientation of the chat window relative to the dashboard to a desired spatial orientation.

In accordance with process block 704, the command comprises a command to change a background color of the chat window to a desired color.

In accordance with process block 704, the command comprises a command to change a background shading of the chat window to a desired shading.

In accordance with process block 704, the command comprises a command to change a text effect of the chat window to a desired text effect.

The computer-implemented method 700 may then proceed to illustrated process block 706, which includes dynamically modifying the aesthetic appearance of the chat window in response to the command and contemporaneously with the virtual chat communication session.

In accordance with process block 706, dynamically modifying the aesthetic appearance of the chat window comprises dynamically modifying, by the one or more financial institution servers in response to the command and contemporaneously with the virtual chat communication session, the size of the chat window to the desired size.

In accordance with process block 706, dynamically modifying the aesthetic appearance of the chat window comprises dynamically modifying, by the one or more financial institution servers in response to the command and contemporaneously with the virtual chat communication session, the general shape of the chat window to the desired shape.

In accordance with process block 706, dynamically modifying the aesthetic appearance of the chat window comprises dynamically modifying, by the one or more financial institution servers in response to the command and contemporaneously with the virtual chat communication session, the geometric configuration of the chat window to the desired geometric configuration.

In accordance with process block 706, dynamically modifying the aesthetic appearance of the chat window comprises dynamically reshaping, by the one or more financial institution servers in response to the command and contemporaneously with the virtual chat communication session, a portion of the chat window to the desired shape.

In accordance with process block 706, dynamically modifying the aesthetic appearance of the chat window comprises dynamically changing, by the one or more financial institution servers in response to the command and contemporaneously with the virtual chat communication session, the spatial orientation of the chat window relative to the dashboard to the desired spatial orientation.

In accordance with process block 706, dynamically modifying the aesthetic appearance of the chat window comprises dynamically changing, by the one or more financial institution servers in response to the command and contemporaneously with the virtual chat communication session, the background color of the chat window to the desired color.

In accordance with process block 706, dynamically modifying the aesthetic appearance of the chat window comprises dynamically modifying, by the one or more financial institution servers in response to the command and contemporaneously with the virtual chat communication session, the background shading of the chat window to the desired shading.

In accordance with process block 706, dynamically modifying the aesthetic appearance of the chat window comprises dynamically changing, by the one or more financial institution servers in response to the command and contemporaneously with the virtual chat communication session, the text effect of the chat window to the desired text effect.

The computer-implemented method 700 may also include executing, by the one or more financial institution servers, NLP of each user command. The computer-implemented method 700 may then include generating, by the one or more financial institution servers in response to the NLP and contemporaneously with the virtual chat communication session, a response to the command. The computer-implemented method 700 may then include transmitting, by the one or more financial institution servers, a chat message presented by the virtual support agent, the chat message containing the generated response.

In accordance with the computer-implemented method 700, the generated response comprises an acknowledgement of the command.

In accordance with the computer-implemented method 700, the generated response comprises a query requesting that the user confirm the command.

In accordance with the computer-implemented method 700, the generated response comprises one or more probing questions.

The computer-implemented method 700 may terminate or end after execution of process block 706.

Figure 8:
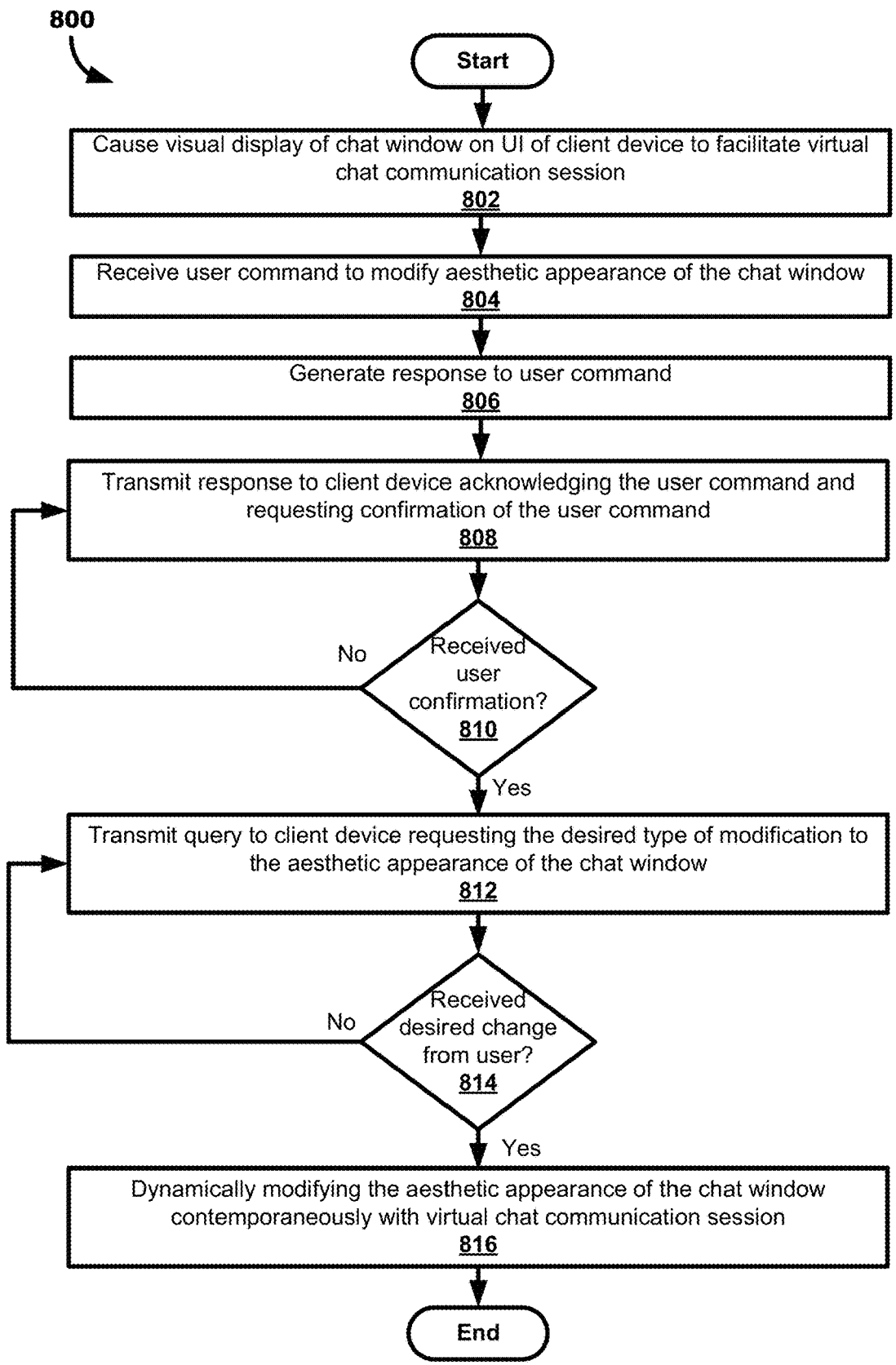

As illustrated in FIG. 8, illustrated process block 802 causing, by one or more financial institution servers 200 associated with the financial institution on a user interface 131*a*, 131*b* of a client device 100 of a user executing a mobile application or desktop application associated with the financial institution over a communication network, a visual display of a GUI comprising a chat window 500 to facilitate a virtual chat communication session between the user and a virtual support agent of the financial institution.

The computer-implemented method 800 may then proceed to illustrated process block 804, which includes receiving, by the one or more financial institution servers from the client device 100 contemporaneously with the virtual chat communication session, a command to modify an aesthetic appearance of the chat window.

In accordance with process block 804, the command comprises a verbal command or a textual command.

In accordance with process block 804, the command comprises a command to modify a size (i.e., minimize or maximize) of the chat window to a desired size.

In accordance with process block 804, the command comprises a command to change the general shape of the chat window to a desired shape.

In accordance with process block 804, the command comprises a command to modify a geometric configuration of the chat window to a desired geometric configuration.

In accordance with process block 804, the command comprises a command to reshape a portion of the chat window to a desired shape.

In accordance with process block 804, the command comprises a command to change the spatial orientation of the chat window relative to the dashboard to a desired spatial orientation.

In accordance with process block 804, the command comprises a command to change a background color of the chat window to a desired color.

In accordance with process block 804, the command comprises a command to change a background shading of the chat window to a desired shading.

In accordance with process block 804, the command comprises a command to change a text effect of the chat window to a desired text effect.

The computer-implemented method 800 may then proceed to illustrated process block 806, which includes generating a response to the user command.

In accordance with process block 806, generating the response to the user command comprises executing, by the one or more financial institution servers, NLP of each user command and then generating, the response to the command based on the NLP.

The computer-implemented method 800 may then proceed to illustrated process block 808, which includes transmitting, by the one or more financial institution servers, a chat message presented by the virtual support agent, the chat message containing the generated response.

In accordance with process block 808, the generated response comprises an acknowledgement of the command and a request for the user to confirm the command.

The computer-implemented method 800 may then proceed to illustrated decision block 810, which determines whether the user has confirmed the command. Should the determination be "No" (i.e., the user has not confirmed the command), the computer-implemented method 800 may then return to illustrated decision block 808.

Should the determination be "Yes" (i.e., the user has confirmed the command), the computer-implemented method 800 may then proceed to illustrated process block 812, which includes transmitting, by the one or more financial institution servers, a query to the client device 100 requesting the specific type of change to the aesthetic appearance of the chat window that is desired by the user.

The computer-implemented method 800 may then proceed to illustrated decision block 814, which determines whether the user has communicated the type of desired change. Should the determination be "No" (i.e., the user has not communicated the specific type of desired change), the computer-implemented method 800 may then return to illustrated decision block 812.

Should the determination be "Yes" (i.e., the user has communicated the specific type of desired change), the computer-implemented method 800 may then proceed to illustrated process block 816, which includes dynamically modifying, by the one or more financial institution servers contemporaneously with the virtual chat communication session, the aesthetic appearance of the chat window to the specific desired change.

In accordance with process block 816, dynamically modifying the aesthetic appearance of the chat window comprises dynamically modifying, by the one or more financial institution servers in response to the command and contemporaneously with the virtual chat communication session, the size of the chat window to the desired size.

In accordance with process block 816, dynamically modifying the aesthetic appearance of the chat window comprises dynamically modifying, by the one or more financial institution servers in response to the command and contemporaneously with the virtual chat communication session, the general shape of the chat window to the desired shape.

In accordance with process block 816, dynamically modifying the aesthetic appearance of the chat window comprises dynamically modifying, by the one or more financial institution servers in response to the command and contemporaneously with the virtual chat communication session, the geometric configuration of the chat window to the desired geometric configuration.

In accordance with process block 816, dynamically modifying the aesthetic appearance of the chat window comprises dynamically reshaping, by the one or more financial institution servers in response to the command and contemporaneously with the virtual chat communication session, a portion of the chat window to the desired shape.

In accordance with process block 816, dynamically modifying the aesthetic appearance of the chat window comprises dynamically changing, by the one or more financial institution servers in response to the command and contemporaneously with the virtual chat communication session, the spatial orientation of the chat window relative to the dashboard to the desired spatial orientation.

In accordance with process block 816, dynamically modifying the aesthetic appearance of the chat window comprises dynamically changing, by the one or more financial institution servers in response to the command and contemporaneously with the virtual chat communication session, the background color of the chat window to the desired color.

In accordance with process block 816, dynamically modifying the aesthetic appearance of the chat window comprises dynamically modifying, by the one or more financial institution servers in response to the command and contemporaneously with the virtual chat communication session, the background shading of the chat window to the desired shading.

In accordance with process block 816, dynamically modifying the aesthetic appearance of the chat window comprises dynamically changing, by the one or more financial institution servers in response to the command and contemporaneously with the virtual chat communication session, the text effect of the chat window to the desired text effect.

In accordance with the computer-implemented method 800, the generated response comprises an acknowledgement of the command.

In accordance with the computer-implemented method 800, the generated response comprises one or more probing questions.

The computer-implemented method 800 may terminate or end after execution of process block 816.

Figure 9:
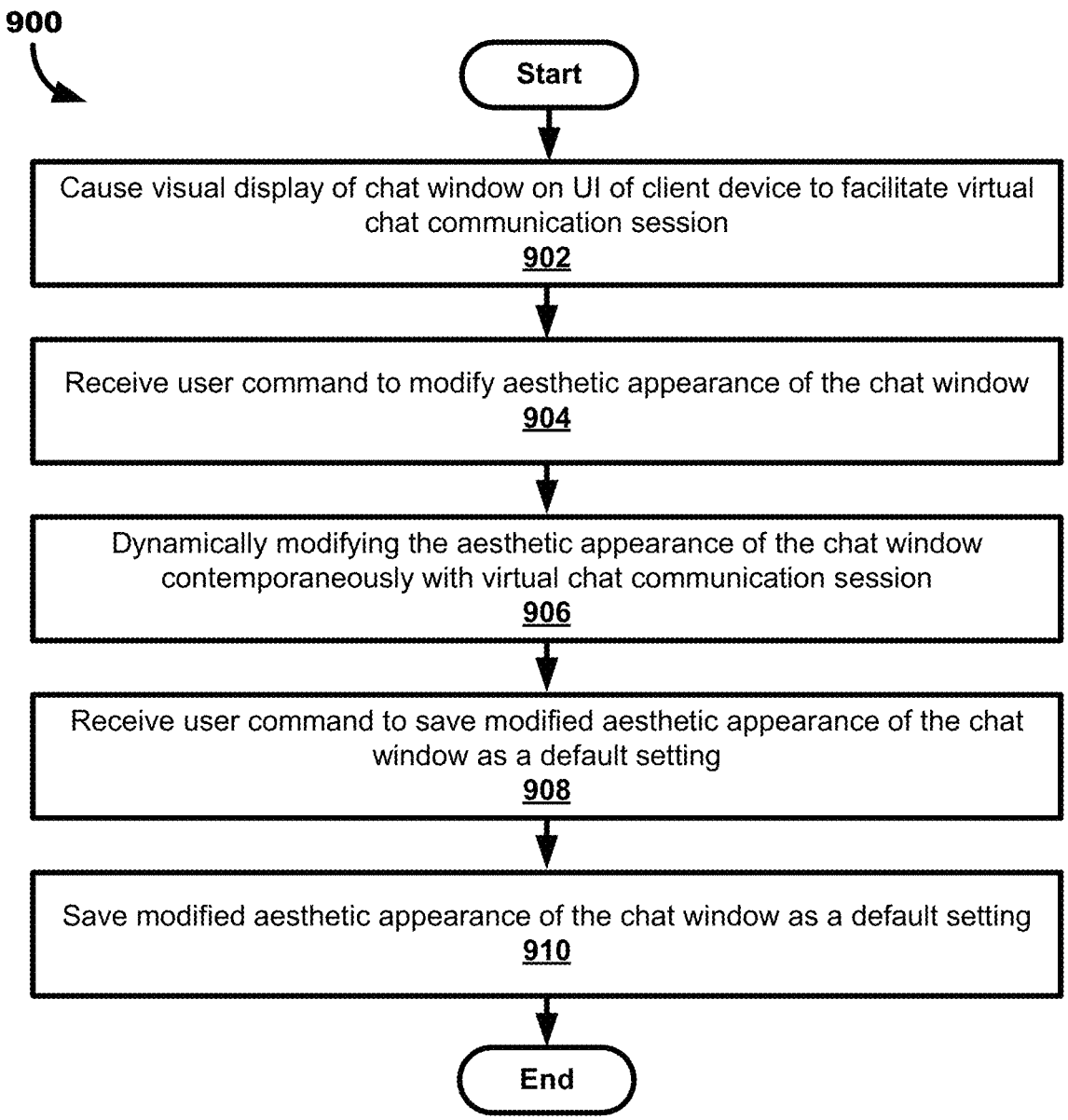

As illustrated in FIG. 9, illustrated process block 902 causing, by one or more financial institution servers 200 associated with the financial institution on a user interface 131*a*, 131*b* of a client device 100 of a user executing a mobile application or desktop application associated with the financial institution over a communication network, a visual display of a GUI comprising a chat window 500 to facilitate a virtual chat communication session between the user and a virtual support agent of the financial institution.

The computer-implemented method 900 may then proceed to illustrated process block 904, which includes receiving, by the one or more financial institution servers from the client device 100 contemporaneously with the virtual chat communication session, a command to modify an aesthetic appearance of the chat window.

In accordance with process block 904, the command comprises a verbal command or a textual command.

In accordance with process block 904, the command comprises a command to modify a size (i.e., minimize or maximize) of the chat window to a desired size.

In accordance with process block 904, the command comprises a command to change the general shape of the chat window to a desired shape.

In accordance with process block 904, the command comprises a command to modify a geometric configuration of the chat window to a desired geometric configuration.

In accordance with process block 904, the command comprises a command to reshape a portion of the chat window to a desired shape.

In accordance with process block 904, the command comprises a command to change the spatial orientation of the chat window relative to the dashboard to a desired spatial orientation.

In accordance with process block 904, the command comprises a command to change a background color of the chat window to a desired color.

In accordance with process block 904, the command comprises a command to change a background shading of the chat window to a desired shading.

In accordance with process block 904, the command comprises a command to change a text effect of the chat window to a desired text effect.

The computer-implemented method 900 may then proceed to illustrated process block 906, which includes dynamically modifying the aesthetic appearance of the chat window.

In accordance with process block 906, dynamically modifying the aesthetic appearance of the chat window comprises dynamically modifying, by the one or more financial institution servers in response to the command and contemporaneously with the virtual chat communication session, the size of the chat window to the desired size.

In accordance with process block 906, dynamically modifying the aesthetic appearance of the chat window comprises dynamically modifying, by the one or more financial institution servers in response to the command and contemporaneously with the virtual chat communication session, the general shape of the chat window to the desired shape.

In accordance with process block 906, dynamically modifying the aesthetic appearance of the chat window comprises dynamically modifying, by the one or more financial institution servers in response to the command and contemporaneously with the virtual chat communication session, the geometric configuration of the chat window to the desired geometric configuration.

In accordance with process block 906, dynamically modifying the aesthetic appearance of the chat window comprises dynamically reshaping, by the one or more financial institution servers in response to the command and contemporaneously with the virtual chat communication session, a portion of the chat window to the desired shape.

In accordance with process block 906, dynamically modifying the aesthetic appearance of the chat window comprises dynamically changing, by the one or more financial institution servers in response to the command and contemporaneously with the virtual chat communication session, the spatial orientation of the chat window relative to the dashboard to the desired spatial orientation.

In accordance with process block 906, dynamically modifying the aesthetic appearance of the chat window comprises dynamically changing, by the one or more financial institution servers in response to the command and contemporaneously with the virtual chat communication session, the background color of the chat window to the desired color.

In accordance with process block 906, dynamically modifying the aesthetic appearance of the chat window comprises dynamically modifying, by the one or more financial institution servers in response to the command and contemporaneously with the virtual chat communication session, the background shading of the chat window to the desired shading.

In accordance with process block 906, dynamically modifying the aesthetic appearance of the chat window comprises dynamically changing, by the one or more financial institution servers in response to the command and contemporaneously with the virtual chat communication session, the text effect of the chat window to the desired text effect.

The computer-implemented method 900 may then proceed to illustrated process block 908, which includes receiving, by the one or more financial institution servers from the client device 100 contemporaneously with the virtual chat communication session, a command to save the modified aesthetic appearance of the chat window as a default setting.

The computer-implemented method 900 may then proceed to illustrated process block 910, which includes saving, by the one or more financial institution servers from the client device 100 contemporaneously with the virtual chat communication session, he modified aesthetic appearance of the chat window as a default setting.

In accordance with the computer-implemented method 900, the generated response comprises an acknowledgement of the command.

In accordance with the computer-implemented method 900, the generated response comprises one or more probing questions.

The computer-implemented method 900 may terminate or end after execution of process block 910.

Figure 10:
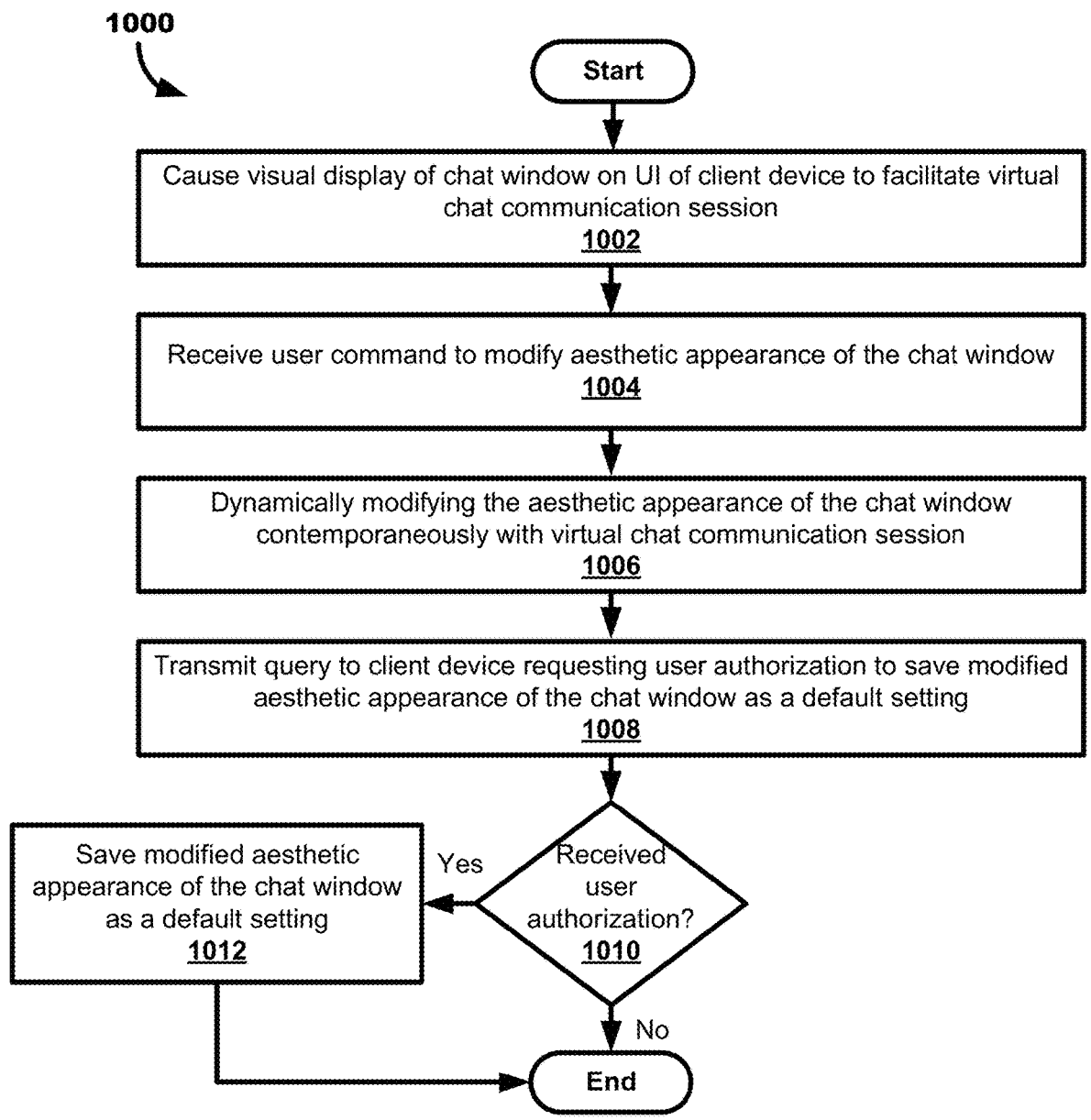

As illustrated in FIG. 10, illustrated process block 1002 causing, by one or more financial institution servers 200 associated with the financial institution on a user interface 131a, 131b of a client device 100 of a user executing a mobile application or desktop application associated with the financial institution over a communication network, a visual display of a GUI comprising a chat window 500 to facilitate a virtual chat communication session between the user and a virtual support agent of the financial institution.

The computer-implemented method 1000 may then proceed to illustrated process block 1004, which includes receiving, by the one or more financial institution servers from the client device 100 contemporaneously with the virtual chat communication session, a command to modify an aesthetic appearance of the chat window.

In accordance with process block 1004, the command comprises a verbal command or a textual command.

In accordance with process block 1004, the command comprises a command to modify a size (i.e., minimize or maximize) of the chat window to a desired size.

In accordance with process block 1004, the command comprises a command to change the general shape of the chat window to a desired shape.

In accordance with process block 1004, the command comprises a command to modify a geometric configuration of the chat window to a desired geometric configuration.

In accordance with process block 1004, the command comprises a command to reshape a portion of the chat window to a desired shape.

In accordance with process block 1004, the command comprises a command to change the spatial orientation of the chat window relative to the dashboard to a desired spatial orientation.

In accordance with process block 1004, the command comprises a command to change a background color of the chat window to a desired color.

In accordance with process block 1004, the command comprises a command to change a background shading of the chat window to a desired shading.

In accordance with process block 1004, the command comprises a command to change a text effect of the chat window to a desired text effect.

The computer-implemented method 1000 may then proceed to illustrated process block 1006, which includes dynamically modifying the aesthetic appearance of the chat window.

In accordance with process block 1006, dynamically modifying the aesthetic appearance of the chat window comprises dynamically modifying, by the one or more financial institution servers in response to the command and contemporaneously with the virtual chat communication session, the size of the chat window to the desired size.

In accordance with process block 1006, dynamically modifying the aesthetic appearance of the chat window comprises dynamically modifying, by the one or more financial institution servers in response to the command and contemporaneously with the virtual chat communication session, the general shape of the chat window to the desired shape.

In accordance with process block 1006, dynamically modifying the aesthetic appearance of the chat window comprises dynamically modifying, by the one or more financial institution servers in response to the command and contemporaneously with the virtual chat communication session, the geometric configuration of the chat window to the desired geometric configuration.

In accordance with process block 1006, dynamically modifying the aesthetic appearance of the chat window comprises dynamically reshaping, by the one or more financial institution servers in response to the command and contemporaneously with the virtual chat communication session, a portion of the chat window to the desired shape.

In accordance with process block 1006, dynamically modifying the aesthetic appearance of the chat window comprises dynamically changing, by the one or more financial institution servers in response to the command and contemporaneously with the virtual chat communication session, the spatial orientation of the chat window relative to the dashboard to the desired spatial orientation.

In accordance with process block 1006, dynamically modifying the aesthetic appearance of the chat window comprises dynamically changing, by the one or more financial institution servers in response to the command and contemporaneously with the virtual chat communication session, the background color of the chat window to the desired color.

In accordance with process block 1006, dynamically modifying the aesthetic appearance of the chat window comprises dynamically modifying, by the one or more financial institution servers in response to the command and contemporaneously with the virtual chat communication session, the background shading of the chat window to the desired shading.

In accordance with process block 1006, dynamically modifying the aesthetic appearance of the chat window comprises dynamically changing, by the one or more financial institution servers in response to the command and contemporaneously with the virtual chat communication session, the text effect of the chat window to the desired text effect.

The computer-implemented method 1000 may then proceed to illustrated process block 1008, which includes transmitting, by the one or more financial institution servers from the client device 100 contemporaneously with the virtual chat communication session, a query to the client device 100 requesting user authorization to save the modified aesthetic appearance of the chat window as a default setting.

The computer-implemented method 900 may then proceed to illustrated decision block 1010, which includes determining whether the user has transmitted authorization to save the modified aesthetic appearance of the chat window as a default setting. Should the determination be "No" (i.e., the user has not given authorization), the computer-implemented method 1000 may then terminate or end.

Should the determination be "Yes" (i.e., the user has given authorization), the computer-implemented method 1000 may then proceed to illustrated process block 1012, which includes dynamically saving, by the one or more financial institution servers contemporaneously with the virtual chat communication session, the modified aesthetic appearance of the chat window as a default setting.

In accordance with the computer-implemented method 1000, the generated response comprises an acknowledgement of the command.

In accordance with the computer-implemented method 1000, the generated response comprises one or more probing questions.

The computer-implemented method 1000 may terminate or end after execution of process block 1012.

Figure 11:
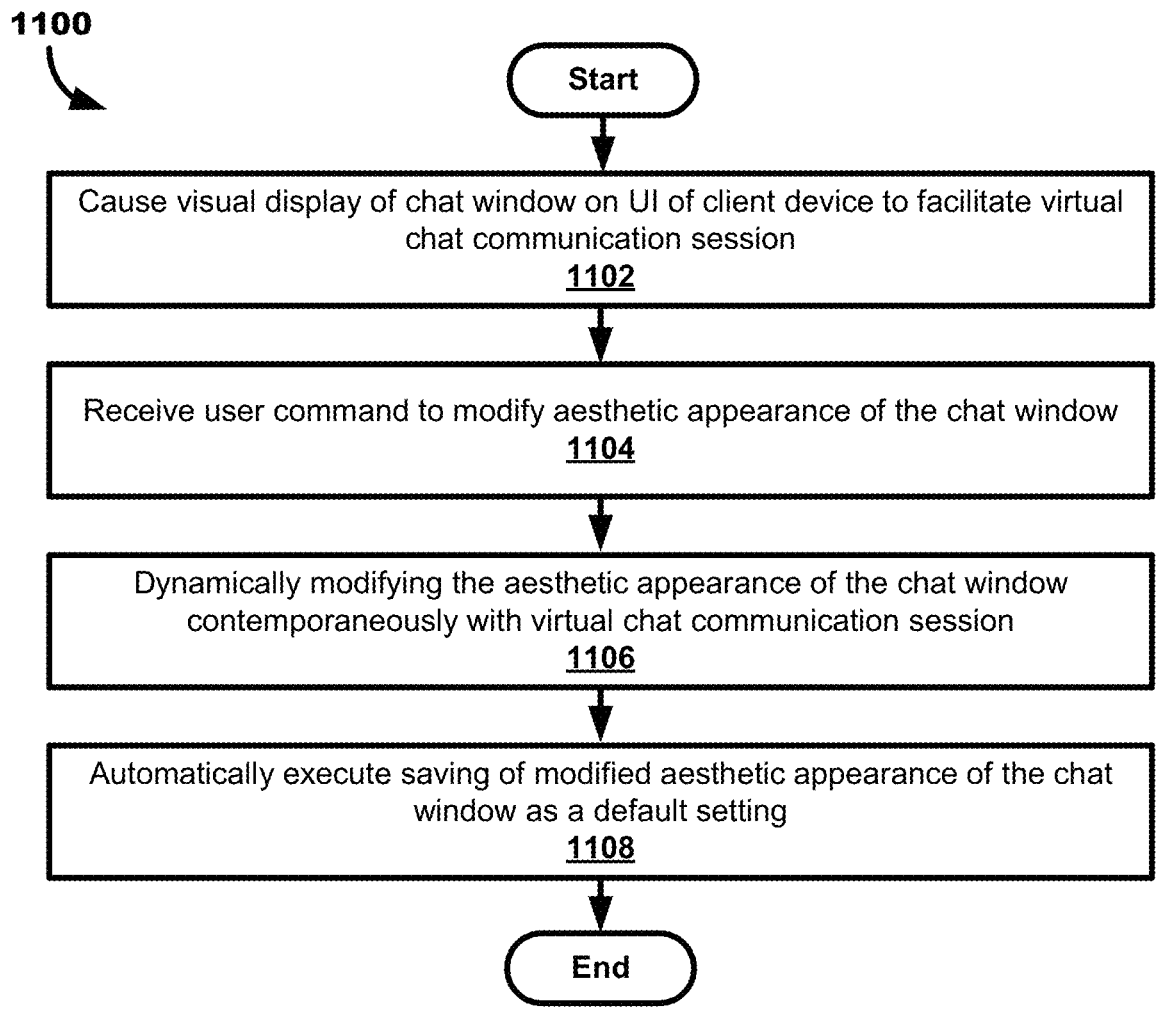

As illustrated in FIG. 11, illustrated process block 1102 causing, by one or more financial institution servers 200 associated with the financial institution on a user interface 131*a*, 131*b* of a client device 100 of a user executing a mobile application or desktop application associated with the financial institution over a communication network, a visual display of a GUI comprising a chat window 500 to facilitate a virtual chat communication session between the user and a virtual support agent of the financial institution.

The computer-implemented method 1100 may then proceed to illustrated process block 1104, which includes receiving, by the one or more financial institution servers from the client device 100 contemporaneously with the virtual chat communication session, a command to modify an aesthetic appearance of the chat window.

In accordance with process block 1104, the command comprises a verbal command or a textual command.

In accordance with process block 1104, the command comprises a command to modify a size (i.e., minimize or maximize) of the chat window to a desired size.

In accordance with process block 1104, the command comprises a command to change the general shape of the chat window to a desired shape.

In accordance with process block 1104, the command comprises a command to modify a geometric configuration of the chat window to a desired geometric configuration.

In accordance with process block 1104, the command comprises a command to reshape a portion of the chat window to a desired shape.

In accordance with process block 1104, the command comprises a command to change the spatial orientation of the chat window relative to the dashboard to a desired spatial orientation.

In accordance with process block 1104, the command comprises a command to change a background color of the chat window to a desired color.

In accordance with process block 1104, the command comprises a command to change a background shading of the chat window to a desired shading.

In accordance with process block 1104, the command comprises a command to change a text effect of the chat window to a desired text effect.

The computer-implemented method 1100 may then proceed to illustrated process block 1106, which includes dynamically modifying the aesthetic appearance of the chat window.

In accordance with process block 1106, dynamically modifying the aesthetic appearance of the chat window comprises dynamically modifying, by the one or more financial institution servers in response to the command and contemporaneously with the virtual chat communication session, the size of the chat window to the desired size.

In accordance with process block 1106, dynamically modifying the aesthetic appearance of the chat window comprises dynamically modifying, by the one or more financial institution servers in response to the command and contemporaneously with the virtual chat communication session, the general shape of the chat window to the desired shape.

In accordance with process block 1106, dynamically modifying the aesthetic appearance of the chat window comprises dynamically modifying, by the one or more financial institution servers in response to the command and contemporaneously with the virtual chat communication session, the geometric configuration of the chat window to the desired geometric configuration.

In accordance with process block 1106, dynamically modifying the aesthetic appearance of the chat window comprises dynamically reshaping, by the one or more financial institution servers in response to the command and contemporaneously with the virtual chat communication session, a portion of the chat window to the desired shape.

In accordance with process block 1106, dynamically modifying the aesthetic appearance of the chat window comprises dynamically changing, by the one or more financial institution servers in response to the command and contemporaneously with the virtual chat communication session, the spatial orientation of the chat window relative to the dashboard to the desired spatial orientation.

In accordance with process block 1106, dynamically modifying the aesthetic appearance of the chat window comprises dynamically changing, by the one or more financial institution servers in response to the command and contemporaneously with the virtual chat communication session, the background color of the chat window to the desired color.

In accordance with process block 1106, dynamically modifying the aesthetic appearance of the chat window comprises dynamically modifying, by the one or more financial institution servers in response to the command and contemporaneously with the virtual chat communication session, the background shading of the chat window to the desired shading.

In accordance with process block 1106, dynamically modifying the aesthetic appearance of the chat window comprises dynamically changing, by the one or more financial institution servers in response to the command and contemporaneously with the virtual chat communication session, the text effect of the chat window to the desired text effect.

The computer-implemented method 1100 may then proceed to illustrated process block 1108, which includes automatically saving, by the one or more financial institution servers contemporaneously with the virtual chat communication session, the modified aesthetic appearance of the chat window as a default setting.

In accordance with the computer-implemented method 1100, the generated response comprises an acknowledgement of the command.

In accordance with the computer-implemented method 1100, the generated response comprises one or more probing questions.

The computer-implemented method 1100 may terminate or end after execution of process block 1108.

In accordance with one or more embodiments set forth, described, and/or illustrated herein, the client device 100 and the one or more financial institution servers 200 could function in a fully virtualized environment. A virtual machine is where all hardware is virtual and operation is run over a virtual processor. The benefits of computer virtualization have been recognized as greatly increasing the computational efficiency and flexibility of a computing hardware platform. For example, computer virtualization facilitates multiple virtual computing machines to execute on a common computing hardware platform. Similar to a physical computing hardware platform, virtual computing machines include storage media, such as virtual hard disks, virtual processors, and other system components associated with a computing environment. For example, a virtual hard disk can store the operating system, data, and application files for a virtual machine. Virtualized computer system includes computing device or physical hardware platform, virtualization software running on hardware platform, and one or more virtual machines running on hardware platform by way of virtualization software. Virtualization software is therefore logically interposed between the physical hardware of hardware platform and guest system software running "in" virtual machine.

Memory of the hardware platform may store virtualization software and guest system software running in virtual machine. Virtualization software performs system resource management and virtual machine emulation. Virtual machine emulation may be performed by a virtual machine monitor (VMM) component. In typical implementations, each virtual machine (only one shown) has a corresponding VMM instance. Depending on implementation, virtualization software may be unhosted or hosted. Unhosted virtualization software generally relies on a specialized virtualization kernel for managing system resources, whereas hosted virtualization software relies on a commodity operating system: the "host operating system," such as Windows or Linux to manage system resources. In a hosted virtualization system, the host operating system may be considered as part of virtualization software.

The system and method described herein may be at least partially processor-implemented, the one or more processors 210 being an example of hardware. For example, at least some of the operations of the computer-implemented methods may be performed by the one or more processors 210 or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors 210, not only residing within a single machine, but deployed across a plurality of machines. In some example embodiments, the one or more processors 210 or processor-implemented modules may be located in a single geographic location (e.g., within a home environment, an office environment, or a server farm). In other example embodiments, the one or more processors or processor-implemented modules may be distributed across a plurality of geographic locations.

Devices that are described as in "communication" with each other or "coupled" to each other need not be in continuous communication with each other or in direct physical contact, unless expressly specified otherwise. On the contrary, such devices need only transmit to each other as necessary or desirable, and may actually refrain from exchanging data most of the time. For example, a machine in communication with or coupled with another machine via the Internet may not transmit data to the other machine for long period of time (e.g. weeks at a time). In addition, devices that are in communication with or coupled with each other may communicate directly or indirectly through one or more intermediaries.

The terms "coupled," "attached," or "connected" may be used herein to refer to any type of relationship, direct or indirect, between the components in question, and may apply to electrical, mechanical, fluid, optical, electromagnetic, electromechanical, or other connections. Additionally, the terms "first," "second," etc. are used herein only to facilitate discussion, and carry no particular temporal or chronological significance unless otherwise indicated. The terms "cause" or "causing" means to make, force, compel, direct, command, instruct, and/or enable an event or action to occur or at least be in a state where such event or action may occur, either in a direct or indirect manner.

Those skilled in the art will appreciate from the foregoing description that the broad techniques of the exemplary embodiments may be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

What is claimed is:

1. A financial institution server computer, comprising:
one or more processors; and
a non-transitory memory coupled to the one or more processors, the non-transitory memory including a set of instructions of computer-executable program code, which when executed by the one or more processors, cause the financial institution server computer to:
cause, during execution of a financial institution mobile application or a financial institution desktop application by a client device over a communication network to facilitate user access to and user management of one or more user financial accounts maintained by the financial institution, a visual display of a chat window on the client device to facilitate a virtual chat communication session between the user and a financial institution chatbot, the chat window being superimposed on a financial institution dashboard having content related to the one or more user financial accounts;
receive, from the client device contemporaneously with the virtual chat communication session, a verbal user command to the financial institution chatbot to modify an aesthetic appearance of the chat window to a desired aesthetic appearance;
cause, in response to the verbal user command, transmission of a chat message by the financial institution chatbot acknowledging the verbal user command and requesting user confirmation of the verbal user command;
randomly select, in response to user confirmation of the verbal user command, an aesthetic feature of the chat window; and
cause, in response to the random selection and contemporaneously with the virtual chat communication session, visual display of the randomly selected aesthetic feature of the chat window.

2. The financial institution server computer of claim 1, wherein the set of instructions, which when executed by the one or more processors, cause the financial institution server computer to transmit, to the client device in response to the visual display of the randomly selected aesthetic feature, a query for visual display on the chat window requesting user confirmation of whether the randomly selected aesthetic feature is acceptable.

3. The financial institution server computer of claim 2, wherein the set of instructions, which when executed by the one or more processors, cause the financial institution server computer to randomly select, in response to receipt of a transmission that the randomly selected aesthetic feature is unacceptable, an alternative aesthetic feature.

4. The financial institution server computer of claim 3, wherein the set of instructions, which when executed by the one or more processors, cause the financial institution server computer to cause, in response to the random selection, visual display of the randomly selected alternative aesthetic feature of the chat window.

5. The financial institution server computer of claim 1, wherein the set of instructions, which when executed by the one or more processors, cause the financial institution server computer to:
receive, from the client device in response to the visual display of the randomly selected aesthetic feature, a verbal user command to save the randomly selected aesthetic feature as a default setting, and
save, in response to the verbal user command to save the randomly selected aesthetic feature as the default setting, the randomly selected aesthetic feature as the default setting.

6. The financial institution server computer of claim 5, wherein the set of instructions, which when executed by the one or more processors, cause the financial institution server computer to:
transmit, to the client device in response to the visual display of the randomly selected aesthetic feature, a query for visual display on the chat window requesting whether the user desires to save the randomly selected aesthetic feature as a default setting;
receive, from the client device in response to the query, a verbal user command to save the randomly selected aesthetic feature as the default setting, and
save, in response to the verbal user command to save the randomly selected aesthetic feature as a default setting, the randomly selected aesthetic feature as a default setting.

7. The financial institution server computer of claim 1, wherein the set of instructions, which when executed by the one or more processors, cause the financial institution server computer to automatically save, in response to the visual display of the randomly selected aesthetic feature, the randomly selected aesthetic feature as a default setting.

8. A computer program product comprising at least one non-transitory computer readable medium having with a set of instructions of computer-executable program code, which when executed by one or more processors of a financial institution server computer, cause the financial institution server computer to:
cause, during execution of a financial institution mobile application or a financial institution desktop application by a client device over a communication network to facilitate user access to and user management of one or more user financial accounts maintained by the financial institution, a visual display of a chat window on the client device to facilitate a virtual chat communication session between the user and a financial institution chatbot, the chat window being superimposed on a financial institution dashboard having content related to the one or more user financial accounts;
receive, from the client device contemporaneously with the virtual chat communication session, a verbal user command to the financial institution chatbot to modify an aesthetic appearance of the chat window to a desired aesthetic appearance;
cause, in response to the verbal user command, transmission of a chat message by the financial institution chatbot acknowledging the verbal user command and requesting user confirmation of the verbal user command;
randomly select, in response to a user confirmation of the verbal user command, an aesthetic feature of the chat window; and
cause, in response to the random selection and contemporaneously with the virtual chat communication session, visual display of the randomly selected aesthetic feature of the chat window.

9. The computer program product of claim 8, wherein the set of instructions, which when executed by the one or more processors, cause the financial institution server computer to transmit, to the client device in response to the visual display of the randomly selected aesthetic feature, a query for visual display on the chat window requesting user confirmation of whether the randomly selected aesthetic feature is acceptable.

10. The computer program product of claim 9, wherein the set of instructions, which when executed by the one or more processors, cause the financial institution server computer to randomly select, in response to receipt of a transmission that the randomly selected aesthetic feature is unacceptable, an alternative aesthetic feature.

11. The computer program product of claim 10, wherein the set of instructions, which when executed by the one or more processors, cause the financial institution server computer to cause, in response to the random selection, visual display of the randomly selected alternative aesthetic feature of the chat window.

12. The computer program product of claim 8, wherein the set of instructions, which when executed by the one or more processors, cause the financial institution server computer to:
receive, from the client device in response to the visual display of the randomly selected aesthetic feature, a verbal user command to save the randomly selected aesthetic feature as a default setting, and
save, in response to the verbal user command to save the randomly selected aesthetic feature as the default setting, the randomly selected aesthetic feature as the default setting.

13. The computer program product of claim 12, wherein the set of instructions, which when executed by the one or more processors, cause the financial institution server computer to:
transmit, to the client device in response to the visual display of the randomly selected aesthetic feature, a query for visual display on the chat window requesting whether the user desires to save the randomly selected aesthetic feature as a default setting;
receive, from the client device in response to the query, a verbal user command to save the randomly selected aesthetic feature as the default setting, and
save, in response to the verbal user command to save the randomly selected aesthetic feature as a default setting, the randomly selected aesthetic feature as a default setting.

14. The computer program product of claim 8, wherein the set of instructions, which when executed by the one or more processors, cause the financial institution server computer to automatically save, in response to the visual display of the randomly selected aesthetic feature, the randomly selected aesthetic feature as a default setting.

15. A computer-implemented method, comprising:
causing, by one or more financial institution server computers during execution of a mobile application or desktop application associated with a financial institution by a client device over a communication network to facilitate user access to and user management of one or more user financial accounts maintained by the financial institution, a visual display of a chat window on the client device to facilitate a virtual chat communication session between the user and a financial institution chatbot, the chat window being superimposed on a financial institution dashboard having content related to the one or more user financial accounts;
receiving, by the one or more financial institution server computers from the client device contemporaneously with the virtual chat communication session, a verbal user command to the financial institution chatbot to modify an aesthetic appearance of the chat window to a desired aesthetic appearance;
causing, by the one or more financial institution server computers in response to the verbal user command, transmission of a chat message by the financial institution chatbot acknowledging the verbal user command and requesting user confirmation of the verbal user command;
randomly selecting, by the one or more financial institution server computers in response to user confirmation of the verbal user command, an aesthetic feature of the chat window; and
causing, by the one or more financial institution server computers in response to the random selection and contemporaneously with the virtual chat communication session, visual display of the randomly selected aesthetic feature.

16. The computer-implemented method of claim 15, further comprising transmitting, by the one or more financial institution server computers to the client device in response to the visual display of the randomly selected aesthetic feature, a query for visual display on the chat window requesting user confirmation of whether the randomly selected aesthetic feature is acceptable.

17. The computer-implemented method of claim 16, further comprising randomly selecting, by the one or more financial institution server computers in response to receipt of a transmission that the randomly selected aesthetic feature is unacceptable, an alternative aesthetic feature.

18. The computer-implemented method of claim 17, further comprising causing, by the one or more financial institution server computers in response to the random selection, visual display of the randomly selected alternative aesthetic feature of the chat window.

19. The computer-implemented method of claim 15, further comprising:
receiving, by the one or more financial institution server computers from the client device in response to the visual display of the randomly selected aesthetic feature, a verbal user command to save the randomly selected aesthetic feature as a default setting, and
saving, by the one or more financial institution server computers in response to the verbal user command to save the randomly selected aesthetic feature as the default setting, the randomly selected aesthetic feature as the default setting.

20. The computer-implemented method of claim 19, further comprising:
transmitting, by the one or more financial institution server computers to the client device in response to the visual display of the randomly selected aesthetic feature, a query for visual display on the chat window requesting whether the user desires to save the randomly selected aesthetic feature as a default setting;
receiving, by the one or more financial institution server computers from the client device in response to the query, a verbal user command to save the randomly selected aesthetic feature as the default setting, and
saving, by the one or more financial institution server computers in response to the verbal user command to save the randomly selected aesthetic feature as a default setting, the randomly selected aesthetic feature as a default setting.

* * * * *